US012739570B2

(12) United States Patent
Ye

(10) Patent No.: US 12,739,570 B2
(45) Date of Patent: Sep. 15, 2026

(54) SOUND APPARATUS

(71) Applicant: LG DISPLAY CO., LTD., Seoul (KR)

(72) Inventor: Jaehun Ye, Tokyo (JP)

(73) Assignee: LG Display Co., Ltd., Seoul (KR)

( * ) Notice: Subject to any disclaimer, the term of this patent is extended or adjusted under 35 U.S.C. 154(b) by 146 days.

(21) Appl. No.: 18/750,121

(22) Filed: Jun. 21, 2024

(65) Prior Publication Data

US 2025/0008272 A1 Jan. 2, 2025

(30) Foreign Application Priority Data

Jun. 29, 2023 (JP) ................................ 2023-107556

(51) Int. Cl.
*H04R 17/00* (2006.01)

(52) U.S. Cl.
CPC .................................... *H04R 17/00* (2013.01)

(58) Field of Classification Search
CPC . H04R 7/02; H04R 7/045; H04R 7/16; H04R 2307/00; H04R 17/00; H04R 1/028
See application file for complete search history.

(56) References Cited

FOREIGN PATENT DOCUMENTS

| | | | | |
|---|---|---|---|---|
| EP | 4231664 | A2 * | 8/2023 | ............... H04R 9/06 |
| JP | 2021090141 | A | 6/2021 | |
| KR | 10-2288653 | B1 | 8/2021 | |
| KR | 10-2310176 | B1 | 10/2021 | |
| KR | 10-2320360 | B1 | 11/2021 | |
| KR | 10-2370837 | B1 | 3/2022 | |

* cited by examiner

*Primary Examiner* — Sunita Joshi
(74) *Attorney, Agent, or Firm* — Fish & Richardson P.C.

(57) ABSTRACT

A sound apparatus includes a vibration member having a plate shape, and a plurality of vibration devices disposed at a surface of the vibration member to vibrate based on a driving signal input thereto, each of the plurality of vibration devices may have a rectangular shape and may be disposed to be rotation-symmetric, and a short side of one of the plurality of vibration devices may be opposite to a long side of another vibration device.

26 Claims, 13 Drawing Sheets

SOUND APPARATUS

CROSS-REFERENCE TO RELATED APPLICATION

This application claims the priority of Japanese Patent Application No. 2023-107556 filed on Jun. 29, 2023, which is hereby incorporated by reference in its entirety.

BACKGROUND

Field of the Disclosure

The present disclosure relates to a sound apparatus.

Description of the Background

Vehicles include a sound apparatus which outputs a sound based on an audio signal output from a multimedia device such as a car audio device. For example, the sound apparatus applied to vehicles may include a front speaker and a rear speaker, which are configured as a coil type.

SUMMARY

Piezoelectric devices used to piezoelectric speakers are limited in vibration width (or displacement width), and due to this, there is a case where a sound pressure level is not sufficient.

Accordingly, the present disclosure is directed to a sound apparatus that substantially obviates one or more of problems due to limitations and disadvantages described above.

More specifically, the present disclosure is to provide a sound apparatus for enhancing sound quality.

Additional features, advantages, and aspects will be set forth in the description that follows, and in part will be apparent from the description, or may be learned by practice of the inventive concepts provided herein. Other features, advantages, and aspects of the present disclosure may be realized and attained by the structure particularly pointed out in the written description, or derivable therefrom, and the claims hereof as well as the appended drawings.

To achieve these and other advantages and aspects of the present disclosure, as embodied and broadly described herein, in one or more aspects, a sound apparatus includes a vibration member having a plate shape, and a plurality of vibration devices disposed at a surface of the vibration member to vibrate based on a driving signal input thereto, each of the plurality of vibration devices may have a rectangular shape and may be disposed to be rotation-symmetric, and a short side of one of the plurality of vibration devices may be opposite to a long side of another vibration device.

In one or more aspects, a sound apparatus includes a vibration member having a plate shape and first to fourth vibration devices disposed at a surface of the vibration member to vibrate based on a driving signal input thereto. Each of the first to fourth vibration devices has a rectangular shape and is disposed to be rotationally symmetrical at a rotation angle of 90 degree with respect to a symmetric central point. A short side of one vibration devices may be close to a long side of a neighboring vibration device.

According to one or more aspects of the present disclosure, a sound apparatus where sound quality is enhanced may be provided.

According to one or more aspects of the present disclosure, a sound apparatus where a sound characteristic and/or a sound pressure level characteristic of a sound of a low-pitched sound band may be enhanced, may be provided.

Other systems, methods, features and advantages will be, or will become, apparent to one with skill in the art upon examination of the following figures and detailed description. It is intended that all such additional systems, methods, features and advantages be included within this description, be within the scope of the present disclosure, and be protected by the following claims. Nothing in this section should be taken as a limitation on those claims. Further aspects and advantages are discussed below in conjunction with aspects of the disclosure.

It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the disclosure, and incorporated in and constitute a part of this disclosure, illustrate aspects and embodiments of the disclosure and together with the description serve to explain principles and examples of the disclosure.

In the drawings.

Figure 1:
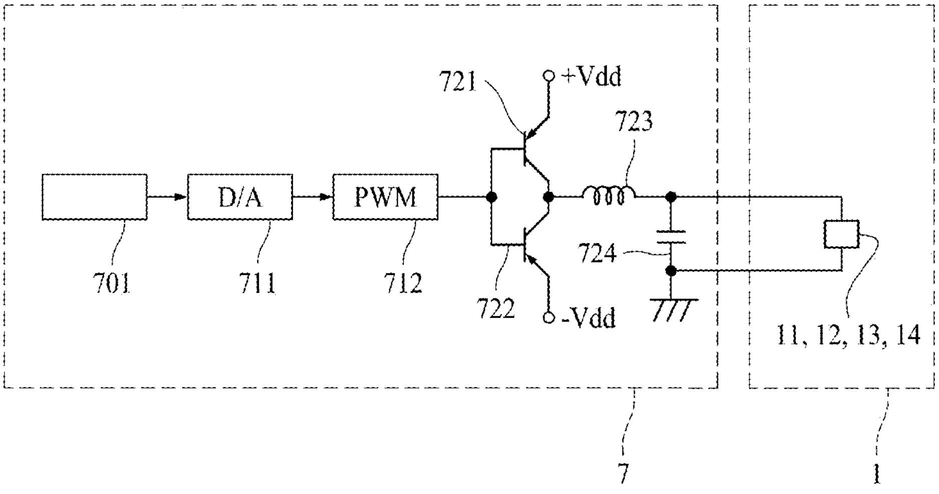
FIG. 1 is a block diagram illustrating a configuration of a sound apparatus and a host system according to a first aspect of the present disclosure.

Throughout the drawings and the detailed description, unless otherwise described, the same drawing reference numerals should be understood to refer to the same elements, features, and structures. The sizes, lengths, and thicknesses of layers, regions and elements, and depiction of thereof may be exaggerated for clarity, illustration, and convenience.

DETAILED DESCRIPTION

Reference is now made in detail to aspects of the present disclosure, examples of which may be illustrated in the accompanying drawings. In the following description, when a detailed description of well-known methods, functions, structures or configurations may unnecessarily obscure aspects of the present disclosure, a detailed description of such known functions or configurations may have been omitted for brevity. Further, repetitive descriptions may be omitted for brevity. The progression of processing steps and/or operations described is a non-limiting example.

The sequence of steps and/or operations is not limited to that set forth herein and may be changed to occur in an order that is different from an order described herein, with the exception of steps and/or operations necessarily occurring in a particular order. In one or more examples, two operations in succession may be performed substantially concurrently, or the two operations may be performed in a reverse order or in a different order depending on a function or operation involved.

Unless stated otherwise, like reference numerals may refer to like elements throughout even when they are shown in different drawings. Unless stated otherwise, the same reference numerals may be used to refer to the same or substantially the same elements throughout the specification and the drawings. In one or more aspects, identical elements (or elements with identical names) in different drawings may have the same or substantially the same functions and properties unless stated otherwise. Names of the respective elements used in the following explanations are selected only for convenience and may be thus different from those used in actual products.

Advantages and features of the present disclosure, and implementation methods thereof, are clarified through the aspects described with reference to the accompanying drawings. The present disclosure may, however, be embodied in different forms and should not be construed as limited to the example aspects set forth herein. Rather, these example aspects are examples and are provided so that this disclosure may be thorough and complete to assist those skilled in the art to understand the inventive concepts without limiting the protected scope of the present disclosure.

Shapes, dimensions (e.g., sizes, lengths, widths, heights, thicknesses, locations, radii, diameters, and areas), proportions, ratios, angles, numbers, the number of elements, and the like disclosed herein, including those illustrated in the drawings, are merely examples, and thus, the present disclosure is not limited to the illustrated details. It is, however, noted that the relative dimensions of the components illustrated in the drawings are part of the present disclosure.

Where a term like "comprise," "have," "include," "contain," "constitute," "made of," "formed of," "composed of," or the like is used with respect to one or more elements (e. g., layers, films, regions, components, sections, members, parts, regions, areas, portions, steps, operations, and/or the like), one or more other elements may be added unless a term such as "only" or the like is used. The terms used in the present disclosure are merely used to describe particular example aspects, and are not intended to limit the scope of the present disclosure. The terms of a singular form may include plural forms unless the context clearly indicates otherwise.

The word "exemplary" is used to mean serving as an example or illustration, unless otherwise specified. Embodiments are example embodiments. Aspects are example aspects. In one or more implementations, "embodiments," "aspects," "examples," and the like should not be construed to be preferred or advantageous over other implementations. An aspect, an example, an example aspect, or the like may refer to one or more aspects, one or more examples, one or more example aspects, or the like, unless stated otherwise. Further, the term "may" encompass all the meanings of the term "may."

In one or more aspects, unless explicitly stated otherwise, an element, feature, or corresponding information (e.g., a level, range, dimension, size, or the like) is construed to include an error or tolerance range even where no explicit description of such an error or tolerance range is provided. An error or tolerance range may be caused by various factors (e.g., process factors, internal or external impact, noise, or the like). In interpreting a numerical value, the value is interpreted as including an error range unless explicitly stated otherwise.

In describing a positional relationship, when the positional relationship between two parts (e.g., layers, films, regions, components, sections, or the like) is described, for example, using "on," "upon," "on top of," "over," "under," "above," "below," "beneath," "near," "close to," "adjacent to," "beside," "next to," "at or on a side of," or the like, one or more other parts may be located between the two parts unless a more limiting term, such as “immediate(ly),” “direct(ly),” or “close(ly),” is used. For example, where a structure is described as being positioned “on,” “upon,” “on top of,” “over,” “under,” “above,” “below,” “beneath,” “near,” “close to,” “adjacent to,” “beside,” “next to,” “at or on a side of,” or the like another structure, this description should be construed as including a case in which the structures contact each other as well as a case in which one or more additional structures are disposed or interposed therebetween. Furthermore, the terms “front,” “rear,” “back,” “left,” “right,” “top,” “bottom,” “downward,” “upward,” “upper,” “lower,” “up,” “down,” “column,” “row,” “vertical,” “horizontal,” and the like refer to an arbitrary frame of reference.

Spatially relative terms, such as “below,” “beneath,” “lower,” “on,” “above,” “upper” and the like, may be used to describe a correlation between various elements (e. g., layers, films, regions, components, sections, or the like) as shown in the drawings. The spatially relative terms are to be understood as terms including different orientations of the elements in use or in operation in addition to the orientation depicted in the drawings. For example, if the elements shown in the drawings are turned over, elements described as “below” or “beneath” other elements would be oriented “above” other elements. Thus, the term “below,” which is an example term, may include all directions of “above” and “below.” Likewise, an exemplary term “above” or “on” may include both directions of “above” and “below.”

In describing a temporal relationship, when the temporal order is described as, for example, “after,” “subsequent,” “next,” “before,” “preceding,” “prior to,” or the like, a case that is not consecutive or not sequential may be included and thus one or more other events may occur therebetween, unless a more limiting term, such as “just,” “immediate(ly),” or “direct(ly),” is used.

The terms, such as “below,” “lower,” “above,” “upper” and the like, may be used herein to describe a relationship between element(s) as illustrated in the drawings. It will be understood that the terms are spatially relative and based on the orientation depicted in the drawings.

It is understood that, although the terms “first,” “second,” or the like may be used herein to describe various elements (e.g., layers, films, regions, components, sections, members, parts, regions, areas, portions, steps, operations, and/or the like), these elements should not be limited by these terms, for example, to any particular order, precedence, or number of elements. These terms are used only to distinguish one element from another. For example, a first element may denote a second element, and, similarly, a second element may denote a first element, without departing from the scope of the present disclosure. Furthermore, the first element, the second element, and the like may be arbitrarily named according to the convenience of those skilled in the art without departing from the scope of the present disclosure. For clarity, the functions or structures of these elements (e.g., the first element, the second element and the like) are not limited by ordinal numbers or the names in front of the elements. Further, a first element may include one or more first elements. Similarly, a second element or the like may include one or more second elements or the like.

In describing elements of the present disclosure, the terms “first,” “second,” “A,” “B,” “(a),” “(b),” or the like may be used. These terms are intended to identify the corresponding element(s) from the other element(s), and these are not used to define the essence, basis, order, or number of the elements.

For the expression that an element (e. g., layer, film, region, component, section, or the like) is described as “connected,” “coupled,” “attached,” “adhered,” or the like to another element, the element may not only be directly connected, coupled, attached, adhered, or the like to another element, but also be indirectly connected, coupled, attached, adhered, or the like to another element with one or more intervening elements disposed or interposed between the elements, unless otherwise specified.

For the expression that an element (e. g., layer, film, region, component, section, or the like) “contacts,” “overlaps,” or the like with another element, the element may not only directly contact, overlap, or the like with another element, but also indirectly contact, overlap, or the like with another element with one or more intervening elements disposed or interposed between the elements, unless otherwise specified.

The phrase that an element (e.g., layer, film, region, component, section, or the like) is “provided,” “disposed,” “connected,” “coupled,” or the like in, on, with or to another element may be understood as that at least a portion of the element is provided, disposed, connected, coupled, or the like in, on, with or to at least a portion of another element, or that the entirety of the element is provided, disposed, connected, coupled, or the like in another element. The phrase that an element (e.g., layer, film, region, component, section, or the like) “contacts,” “overlaps,” or the like with another element may be understood, for example, as that at least a portion of the element contacts, overlaps, or the like with a least a portion of another element, that the entirety of the element contacts, overlaps, or the like with a least a portion of another element, or that at least a portion of the element contacts, overlaps, or the like with the entirety of another element.

The terms such as a “line” or “direction” should not be interpreted only based on a geometrical relationship in which the respective lines or directions are parallel or perpendicular to each other. Such terms may mean a wider range of lines or directions within which the components of the present disclosure may operate functionally. For example, the terms “first direction,” “second direction,” and the like, such as a direction parallel or perpendicular to “x-axis,” “y-axis,” or “z-axis,” should not be interpreted only based on a geometrical relationship in which the respective directions are parallel or perpendicular to each other, and may be meant as directions having wider directivities within the range within which the components of the present disclosure may operate functionally.

The term “at least one” should be understood as including any and all combinations of one or more of the associated listed items. For example, each of the phrases of “at least one of a first item, a second item, or a third item” and “at least one of a first item, a second item, and a third item”, may represent (i) a combination of items provided by one or more of the first item, the second item, and the third item or (ii) only one of the first item, the second item, and the third item.

The expression of a first element, a second elements, “and/or” a third element should be understood to encompass one of the first, second, and third elements, as well as any and all combinations of the first, second and third elements. By way of example, A, B and/or C encompass only A; only B; only C; any of A, B, and C (c. g., A, B, or C); some combinations of A, B, and C (e. g., A and B; A and C; or B and C); and all of A, B, and C. Furthermore, an expression “A/B” may be understood as A and/or B. For example, an expression “A/B” may refer to only A; only B; A or B; or A and B.

In one or more aspects, the terms "between" and "among" may be used interchangeably simply for convenience unless stated otherwise. For example, an expression "between a plurality of elements" may be understood as among a plurality of elements. In another example, an expression "among a plurality of elements" may be understood as between a plurality of elements. In one or more examples, the number of elements may be two. In one or more examples, the number of elements may be more than two. Furthermore, when an element (e.g., layer, film, region, component, sections, or the like) is referred to as being "between" at least two elements, the element may be the only element between the at least two elements, or one or more intervening elements may also be present.

In one or more aspects, the phrases "each other" and "one another" may be used interchangeably simply for convenience unless stated otherwise. For example, an expression "different from each other" may be understood as different from one another. In another example, an expression "different from one another" may be understood as different from each other. In one or more examples, the number of elements involved in the foregoing expression may be two. In one or more examples, the number of elements involved in the foregoing expression may be more than two.

In one or more aspects, the phrases "one or more among" and "one or more of" may be used interchangeably simply for convenience unless stated otherwise.

The term "or" means "inclusive or" rather than "exclusive or." For example, unless otherwise stated or clear from the context, the expression that "x uses a or b" means any one of natural inclusive permutations. For example, "a or b" may mean "a," "b," or "a and b." For example, "a, b or c" may mean "a," "b," "c," "a and b," "b and c," "a and c," or "a, b and c."

Features of various aspects of the present disclosure may be partially or entirely coupled to or combined with each other, may be technically associated with each other, and may be operated, linked, or driven together in various ways. Aspects of the present disclosure may be implemented or carried out independently from each other, or may be implemented or carried out together in a co-dependent or related relationship. In one or more aspects, the components of each apparatus according to various aspects of the present disclosure may be operatively coupled and configured.

Unless otherwise defined, the terms (including technical and scientific terms) used herein have the same meaning as commonly understood by one of ordinary skill in the art to which example aspects belong. It should be further understood that terms, such as those defined in commonly used dictionaries, should be interpreted as having a meaning that is, for example, consistent with their meaning in the context of the relevant art and should not be interpreted in an idealized or overly formal sense, unless expressly defined otherwise herein.

The terms used herein have been selected as being general in the related technical field; however, there may be other terms depending on the development and/or change of technology, convention, preference of technicians, and so on. Therefore, the terms used herein should not be understood as limiting technical ideas, but should be understood as examples of the terms for describing example aspects.

Further, in a specific case, a term may be arbitrarily selected by an applicant, and in this case, the detailed meaning thereof is described herein. Therefore, the terms used herein should be understood based on not only the name of the terms, but also the meaning of the terms and the content hereof.

"X-axis direction," "Y-axis direction," and "Z-axis direction," should not be construed by a geometric relation only of a mutual vertical relation and may have broader directionality within the range that elements of the present disclosure may act functionally.

In the following description, various example aspects of the present disclosure are described in detail with reference to the accompanying drawings. With respect to reference numerals to elements of each of the drawings, the same elements may be illustrated in other drawings, and like reference numerals may refer to like elements unless stated otherwise. The same or similar elements may be denoted by the same reference numerals even though they are depicted in different drawings.

In addition, for convenience of description, a scale, dimension, size, and thickness of each of the elements illustrated in the accompanying drawings may be different from an actual scale, dimension, size, and thickness, and thus, aspects of the present disclosure are not limited to a scale, dimension, size, and thickness illustrated in the drawings.

First Aspect

FIG. 1 is a block diagram illustrating a configuration of a sound apparatus 1 according to an aspect of the present disclosure. A driving signal (or a sound signal or a voice signal) input to the sound apparatus 1 will be described with reference to FIG. 1. The sound apparatus 1 may be individually used as a speaker, or may be embedded into an advertising signboard, a poster, a noticeboard, a vehicle, a building, or display apparatus or the like. The use of the sound apparatus 1 according to an aspect of the present disclosure is not particularly limited thereto.

In an aspect of the present disclosure, the sound apparatus 1 may include four vibration devices 11, 12, 13, and 14. The vibration devices 11, 12, 13, and 14 may be a device which is displaced based on an inverse piezoelectric effect when a voltage is applied based on a driving signal input thereto. The vibration devices 11, 12, 13, and 14, for example, may be an element which is flexurally displaced based on a voltage such as bimorph, unimorph, or multimorph. An input driving signal may be an alternating current (AC) voltage generally, and thus, the vibration devices 11, 12, 13, and 14 may vibrate based on the input driving signal to generate a vibration and/or a sound. For example, the vibration devices 11, 12, 13, and 14 may be a vibration generating device, a sound generating device, a piezoelectric device, a vibration generator, a sound generator, a piezoelectric speaker, or a voice generating device.

A host system 7 may be a system including an apparatus or a plurality of apparatuses, which supply the driving signal to control the sound apparatus 1. However, the host system 7 may further supply other signals such as an image signal (for example, RGB data or RGBW data) and a timing signal (for example, a vertical synchronization signal, a horizontal synchronization signal, and a data enable signal, etc.) or the like based on the use purpose of the sound apparatus 1. The host system 7 may be, for example, a source sound reproduction apparatus, a local broadcast apparatus, a radio broadcast reproduction system, a television (TV) system, a set-top box, a navigation system, an optical disk player, a computer, a home theater system, a video phone system, or the like. Further, the sound apparatus 1 and the host system 7 may be an integrated apparatus or separate apparatuses.

The host system 7 may include an input part 701, a digital-to-analog (D/A) converter 711, a pulse width modulation (PWM) circuit 712, transistors 721 and 722, a coil 723, and a capacitor 724. The input part 701 may input a digital signal to control the vibration devices 11, 12, 13, and 14. The D/A converter 711 may convert the digital signal input from the input part 701 into an analog signal. The PWM circuit 712 may pulse-width-modulate the analog signal input from the D/A converter 711 to output a pulse signal. The transistors 721 and 722 may include a PNP type transistor 721 and an NPN type transistor 722. The PNP type transistor 721 and the NPN type transistor 722 may configure a push-pull circuit. For example, a collector terminal of each of the transistors 721 and 722 may be connected to each other, and a base terminal of each of the transistors 721 and 722 may be connected to each other. A positive voltage +Vdd may be applied to an emitter terminal of the transistor 721, and a negative voltage −Vdd may be applied to an emitter terminal of the transistor 722. The pulse signal from the PWM circuit 712 may be applied to the base terminals of the transistors 721 and 722, and the transistors 721 and 722 may be complementarily turned on or turned off based on the pulse signal. For example, when a positive pulse signal is applied to the base terminals of the transistors 721 and 722, the transistor 721 may be turned on and the transistor 722 may be turned off. Therefore, a voltage of the collector terminal of each of the transistors 721 and 722 may be a voltage +Vdd. Meanwhile, when the negative pulse signal is applied to the base terminals of the transistors 721 and 722, the transistor 721 may be turned off and the transistor 722 may be turned on. Therefore, a voltage of the collector terminal of each of the transistors 721 and 722 may be a voltage −Vdd. In addition, when a potential of the pulse signal is a ground potential, the transistors 721 and 722 may be turned off simultaneously. The coil 723 and the capacitor 724 may each function as a low pass filter and may smooth the pulse signal at the collector terminal of each of the transistors 721 and 722 to output to the vibration devices 11, 12, 13, and 14 as a driving signal (or a voice signal or a sound signal).

Figure 2A:
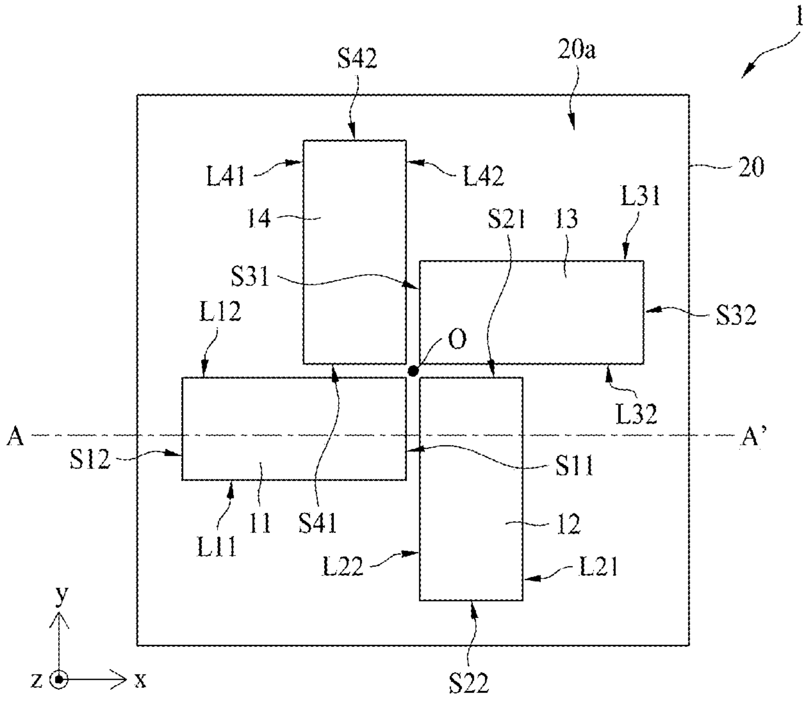
FIG. 2A is a plan view illustrating a configuration of a sound apparatus according to a first aspect of the present disclosure.
Figure 2B:
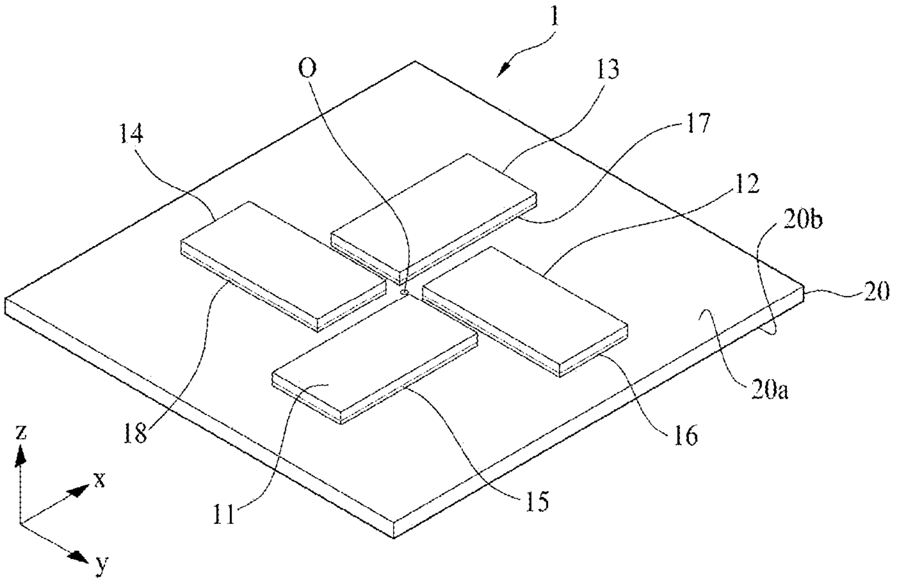
FIG. 2B is a perspective view illustrating a configuration of a sound apparatus according to a first aspect of the present disclosure.
Figure 3A:
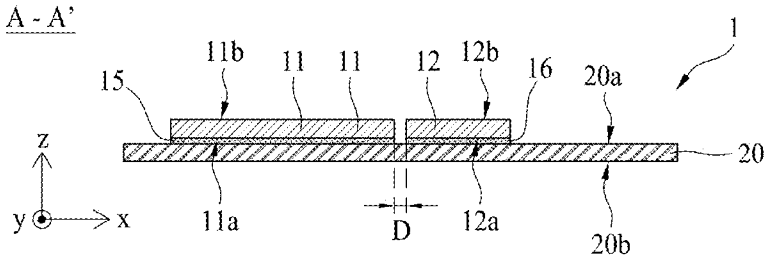
FIG. 3A is a cross-sectional view taken along line A-A' illustrated in FIG. 1 according to a first aspect of the present disclosure.
Figure 3B:
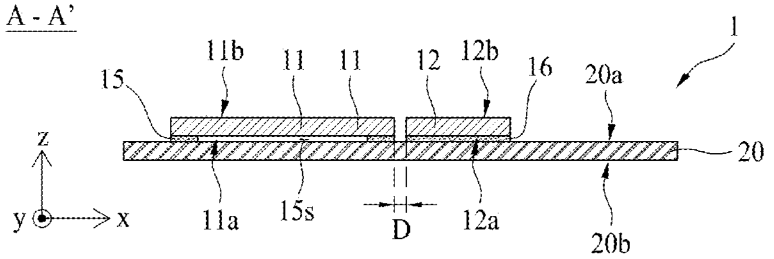
FIG. 3B is another cross-sectional view taken along line A-A' illustrated in FIG. 1 according to a first aspect of the present disclosure.

FIG. 2A is a plan view illustrating a configuration of a sound apparatus according to an aspect of the present disclosure. FIG. 2B is a perspective view illustrating a configuration of a sound apparatus according to an aspect of the present disclosure. FIG. 2B is a perspective view illustrating a configuration of a sound apparatus according to a first aspect of the present disclosure. FIG. 3A is a cross-sectional view taken along line A-A' of FIG. 1 according to an aspect of the present disclosure. FIG. 3B is another cross-sectional view taken along line A-A' of FIG. 1 according to an aspect of the present disclosure. A detailed configuration of a sound apparatus 1 according to an aspect of the present disclosure will be described with cross-reference to FIGS. 2A, 2B, 3A, and 3B.

As illustrated in FIGS. 2A and 2B, the sound apparatus 1 may include a plurality of vibration devices 11, 12, 13, and 14, and a vibration member 20. The sound apparatus 1 may include four vibration devices 11, 12, 13, and 14, and a vibration member 20. The vibration devices 11, 12, 13, and 14 may one-dimensionally (or when seen in a plane or in a plan view) have a rectangular shape. The vibration devices 11, 12, 13, and 14 may have a flat plate shape. In FIGS. 2A, 2B, 3A, and 3B, a coordinate-axis is illustrated where directions of long-axis direction of each of the vibration device 11 and the vibration device 13 are the x-axis, short-axis direction of each of the vibration device 11 and the vibration device 13 are the y-axis, and a direction perpendicular to the x-axis and the y-axis is the z-axis. The long-axis direction of each of the vibration device 12 and the vibration device 14 may be parallel to the y-axis, and the short-axis direction of each of the vibration device 12 and the vibration device 14 may be parallel to the x-axis.

The vibration member 20 may be a passive vibration member, a vibration plate, or a vibration substrate. The vibration member 20 may be configured in a material such as metal, resin, glass, hard paper, wood, rubber, plastic, fiber, cloth, paper, leather, or carbon or the like, but aspects of the present disclosure are not limited thereto. For example, an example of the metal that may be configured in the vibration member 20 may include stainless steel, but aspects of the present disclosure are not limited thereto. For example, the vibration member 20 may be configured in styrene material. Further, the vibration member 20 may include a display panel including a pixel configured to display an image, a screen panel on which an image is to be projected from a display apparatus, a lighting panel, a light emitting diode lighting panel, an organic light emitting lighting panel, an inorganic light emitting lighting panel, a signage panel, a vehicular interior material, a vehicular glass window (or a vehicular window), a vehicular exterior material, a vehicular seat interior material, a vehicular ceiling material, a building ceiling material, a building interior material, a building glass window, an aircraft interior material, an aircraft glass window, or a mirror, but aspects of the present disclosure are not limited thereto.

Moreover, as illustrated in FIG. 3A, the vibration devices 11 and 12 may each include two main surfaces opposite to each other. In an aspect of the present disclosure, surfaces of the two main surfaces of each of the vibration devices 11 and 12 in a sub-direction side (or negative direction side) of the z-axis may be referred as first main surfaces 11*a* and 12*a*, and surfaces of the two main surfaces of each of the vibration devices 11 and 12 in a forward direction side (or positive direction side) of the z-axis may be referred as second main surfaces 11*b* and 12*b*. This may be the same as the vibration devices 13 and 14 (not illustrated in FIGS. 3A and 3B). For example, surfaces of the two main surfaces of each of the vibration devices 13 and 14 in a sub-direction side (or negative direction side or rearward direction) of the z-axis may be referred as first main surfaces, and surfaces of the two main surfaces of each of the vibration devices 13 and 14 in a forward direction side (or positive direction side) of the z-axis may be referred as second main surfaces.

Similarly, the vibration member 20 may each include two main surfaces 20*a* and 20*b* opposite to each other. In an aspect of the present disclosure, a surface of the two main surfaces of the vibration member 20 in a forward direction side of the z-axis may be referred as a first main surface 21*a*, and a surface of the two main surfaces of the vibration member 20 in a sub-direction side of the z-axis may be referred as a second main surface 20*b*.

As illustrated in FIGS. 2B, 3A, and 3B, the vibration devices 11, 12, 13, and 14 may each be disposed on the first main surface 20*a* of the vibration member 20. For example, the first main surface 20*a* of the vibration devices 11 and 12 and the first main surface of the vibration device 13 and 14 may contact the vibration member 20. For example, each of the vibration devices 11, 12, 13, and 14 may each be connected by the vibration member 20 and adhesive members 15, 16, 17, and 18.

According to an aspect of the present disclosure, as illustrated in FIGS. 2A and 3A, each of the vibration devices 11, 12, 13, and 14 may be connected or attached to the vibration member 20 by an entire surface attachment scheme using adhesive members 15, 16, 17, and 18. For example, the first main surface 11*a* of the vibration device (or a first vibration device) 11 may be connected or attached to a front surface of the first main surface 20*a* of the vibration member 20 by a first adhesive member 15. The first main surface 12*a* of the vibration device (or a second vibration device) 12 may be connected or attached to a front surface of the first main surface 20*a* of the vibration member 20 by a second adhesive member 16. The first main surface of the vibration device (or a third vibration device) 13 may be connected or attached to a front surface of the first main surface 20*a* of the vibration member 20 by a third adhesive member 17. The first main surface of the vibration device (or a fourth vibration device) 14 may be connected or attached to a front surface of the first main surface 20*a* of the vibration member 20 by a fourth adhesive member 18.

According to another aspect of the present disclosure, as illustrated in FIG. 3B, each of the vibration devices 11, 12, 13, and 14 may be connected or attached to the vibration member 20 by a partial attachment scheme using the adhesive members 15, 16, 17, and 18. For example, a portion of each of the vibration devices 11, 12, 13, and 14 may be connected or attached to the vibration member 20 by the partial attachment scheme using the adhesive members 15, 16, 17, and 18. For example, a portion of the first main surface 11*a* of the vibration device (or a first vibration device) 11 may be connected or attached to a portion of the first main surface 20*a* of the vibration member 20 by the first adhesive member 15. A portion of the first main surface 12*a* of the vibration device (or a second vibration device) 12 may be connected or attached to a portion of the first main surface 20*a* of the vibration member 20 by the second adhesive member 16. A portion of the first main surface of the vibration device (or a third vibration device) 13 may be connected or attached to a portion of the first main surface 20*a* of the vibration member 20 by the third adhesive member 17. A portion of the first main surface of the vibration device (or a fourth vibration device) 14 may be connected or attached to a portion of the first main surface 20*a* of the vibration member 20 by the fourth adhesive member 18.

According to another aspect of the present disclosure, the adhesive members 15, 16, 17, and 18 may be attached (or interposed) between the vibration member 20 and an edge portion (or a periphery portion), except a center portion, of each of the vibration devices 11, 12, 13, and 14 by the partial attachment scheme. For example, the edge portion of each of the vibration devices 11, 12, 13, and 14 may be connected or attached to the first main surface 20*a* of the vibration member 20 by the adhesive members 15, 16, 17, and 18. For example, an air gap 15*s* may be configured between each of the vibration devices 11 to 14 and the vibration member 20. The air gap 15*s* may be configured between the center portion of each of the vibration devices 11 to 14 and the vibration member 20. The air gap 15*s* may enable each of the vibration devices 11 to 14 and the vibration member 20 to independently vibrate without being dependent on each other. Further, the air gap 15*s* may enable a smooth vibration of each of the vibration devices 11 to 14 and a free strain (or free displacement or free deformation) of the vibration member 20 based thereon, and thus, may increase a vibration width of the vibration member 20, thereby increasing a sound pressure level characteristic of a sound generated by a vibration of the vibration member 20.

According to another aspect of the present disclosure, each of the adhesive members 15, 16, 17, and 18 may include an elasticity material which has adhesiveness and is capable of compression and decompression. For example, the adhesive members 15, 16, 17, and 18 may include an adhesive material having elasticity or flexibility. For example, the adhesive members 15, 16, 17, and 18 may include an adhesive material which is low in elastic modulus (or Young's modulus). For example, the adhesive members 15, 16, 17, and 18 may be configured in an adhesive resin, an adhesive, an adhesive tape, an adhesive pad, or the like, but aspects of the present disclosure are not limited thereto. For example, the adhesive tape may include a double-sided tape, a double-sided foam tape, a double-sided sponge tape, which have adhesive layers, or the like, but aspects of the present disclosure are not limited thereto. The adhesive pad may have an adhesive layer and may an clastic pad such as a silicone pad or a rubber pad capable of compression and decompression.

The adhesive resin, the adhesive, or the adhesive layer of each of the adhesive members 15, 16, 17, and 18 according to another aspect of the present disclosure may include epoxy-based, acryl-based, silicone-based, or urethane-based. For example, the adhesive members 15, 16, 17, and 18 may include an acrylic-based material which is relatively better in adhesive force and hardness than urethane so that the vibration of the vibration devices 11, 12, 13, and 14 may be transmitted to the vibration member 20 well, but aspects of the present disclosure are not limited thereto.

The adhesive resin, the adhesive, or the adhesive layer of each of the adhesive members 15, 16, 17, and 18 according to an aspect of the present disclosure may be a photo-curable adhesive material, but aspects of the present disclosure are not limited thereto. For example, the adhesive resin, the adhesive, or the adhesive layer may be an ultraviolet (UV) adhesive, but aspects of the present disclosure are not limited thereto.

The vibration devices 11, 12, 13, and 14 may be connected to a host system 7, which is a common driving circuit, in parallel. Therefore, when a driving signal (or voice signal or a sound signal) is applied to the vibration devices 11, 12, 13, and 14 from the host system 7, the vibration devices 11, 12, 13, and 14 may vibrate in synchronization with one another, based on the driving signal. A vibration generated from each of the vibration devices 11, 12, 13, and 14 may be transferred to the vibration member 20 directly (or through the adhesive member). For example, the vibration devices 11, 12, 13, and 14 may simultaneously receive the driving signal (or voice signal or the sound signal) from the host system 7 and may be simultaneously driven (or vibrate) in synchronization with one another, based on the driving signal. For example, the vibration devices 11, 12, 13, and 14 may be configured to be simultaneously driven (or vibrate) in synchronization with one another without being individually driven (or vibrate), based on the driving signal. For example, the driving signal may be applied to the vibration devices 11, 12, 13, and 14 through one driving line in common.

Moreover, in a plane, the vibration devices 11, 12, 13, and 14 may be spaced apart from one another by a certain (or a pre-defined) distance D without overlapping one another. A distance (or separation distance) D may be, for example, 25 mm to 50 mm, but aspects of the present disclosure are not limited thereto. For example, the distance (or separation distance) D may be arbitrarily changed.

In four vibration devices 11, 12, 13, and 14, a short side of one vibration device may be opposite to a long side of the other adjacent vibration device. In detail, a short side S11 of the vibration device 11 may be opposite to a long side L22 of an adjacent vibration device 12. Likewise, a short side S21 of the vibration device 12 may be opposite to a long side L32 of an adjacent vibration device 13. A short side S31 of the vibration device 13 may be opposite to a long side L42 of an adjacent vibration device 14. A short side S41 of the vibration device 14 may be opposite to a long side L12 of an adjacent vibration device 11. For example, long-axis directions of two adjacent vibration devices may intersect with each other. For example, a long-axis direction of the first vibration device and a long-axis direction of the second vibration device may intersect with each other. For example, an angle between the long-axis direction of the first vibration device and the long-axis direction of the second vibration device may be 90 degrees.

Moreover, in a plane (an x-y plane), the vibration devices 11, 12, 13, and 14 may be arranged (or disposed) to be rotation-symmetric with respect to one point (hereinafter referred to as a symmetric central point) O of the first main surface 20*a* of the vibration member 20. In detail, four vibration devices 11, 12, 13, and 14 may be rotationally symmetrical at a rotation angle of 90 degree with respect to the symmetric point O. For example, the vibration device 12 of two adjacent vibration devices 11 and 12 may have a structure which has rotated by 90 degrees in a counterclockwise direction from the vibration device 11 with respect to the symmetric central point O of the first main surface 20*a* of the vibration member 20.

Figure 4:
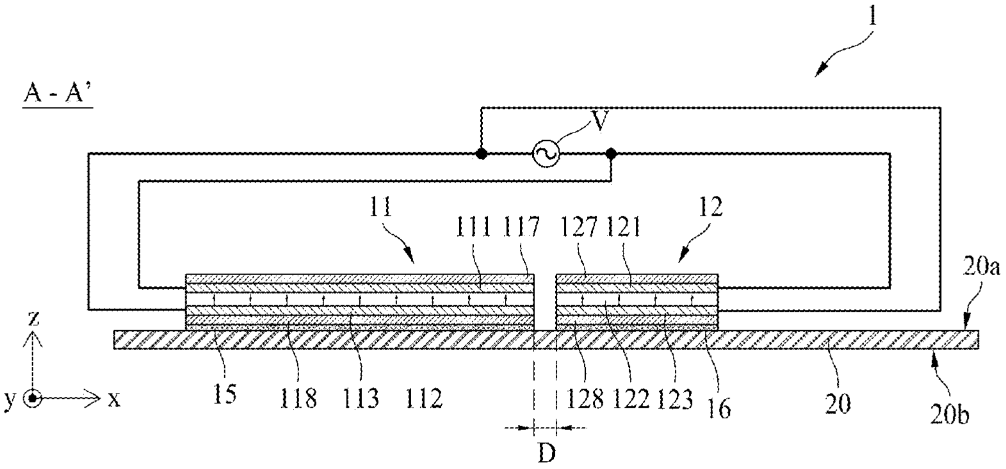
FIG. 4 is a cross-sectional view illustrating a configuration of a sound apparatus according to a first aspect of the present disclosure in more detail.

The aspect of the structure of the sound apparatus 1 will be described in more detail with reference to FIG. 4. FIG. 4 is an enlarged view of illustrating the vibration devices 11 and 12 at a same section as that of FIG. 3A. Moreover, in FIG. 4, a connection relationship of each electrode included in the vibration devices 11 and 12 schematically illustrates by a circuit diagram to describe a method for inputting a driving signal to the sound apparatus 1. The vibration devices 13 and 14 may be substantially a same structure as that of the vibration devices 11 and 12, and thus, its detailed description may be omitted.

The vibration device 11 may include an electrode (or a first electrode) 111, a vibration layer (or a piezoelectric layer) 112, and an electrode (or a second electrode) 113. The electrode 111 and the electrode 113 may be arranged with (or disposed) the vibration layer 112 therebetween in a thickness direction. A voltage V may be applied to the vibration layer 112 through the electrode 111 and the electrode 113. The voltage V may correspond to a driving signal (or a voice signal or a sound signal).

The vibration device 11 may further include a protection layer (or a first protection member) 117. The protection layer 117 may be configured to protect and/or insulate an upper surface of the electrode 111.

The vibration device 11 may further include a second protection layer (or a second protection member) 118. The second protection layer 118 may be configured to protect and/or insulate a lower surface of the electrode 113. For example, one or more of the protection layer 117 and the second protection layer 118 may be omitted.

The vibration device 11 may be connected to the first main surface 20*a* of the vibration member 20 by an adhesive member 15. The adhesive member 15 may be configured to connect the vibration device 11 to the first main surface 20*a* of the vibration member 20.

Similarly, the vibration device 12 may include an electrode (or a first electrode) 121, a vibration layer (or a piezoelectric layer) 122, and an electrode (or a second electrode) 123. The electrode 121 and the electrode 123 may be arranged with (or disposed) the vibration layer 122 therebetween in a thickness direction. A voltage V may be applied to the vibration layer 122 through the electrode 121 and the electrode 123. The voltage V may correspond to a driving signal (or a voice signal or a sound signal).

The vibration device 12 may further include a protection layer (or a first protection member) 127. The protection layer 127 may be configured to protect and/or insulate an upper surface of the electrode 121.

The vibration device 12 may further include a second protection layer (or a second protection member) 128. The second protection layer 128 may be configured to protect and/or insulate a lower surface of the electrode 123. For example, one or more of the protection layer 127 and the second protection layer 128 may be omitted.

The vibration device 12 may be connected to the first main surface 20*a* of the vibration member 20 by an adhesive member 16. The adhesive member 16 may be configured to connect the vibration device 12 to the first main surface 20*a* of the vibration member 20.

In an aspect of the present disclosure, a poling direction (or a polarization direction) of the vibration layer 112 and 122 may be a forward direction (or a positive direction) or a sub-direction direction (or a negative direction) of the z-axis, as illustrated in FIG. 4. Further, wires (or lines) configured to apply a voltage to each electrode may be connected to the electrodes 111, 113, 121, and 123 by soldering or the like.

When an AC voltage is applied between the electrode 111 and the electrode 113 of the vibration device 11, the vibration layer 112 may contract and expand, and a periodic stress may be applied to the vibration member 20. Likewise, when an AC voltage is applied between the electrode 121 and the electrode 123 of the vibration device 12, the vibration layer 122 may contract and expand, and a periodic stress may be applied to the vibration member 20. That is, the vibration devices 11 and 12 may transfer the periodic stress to the vibration member 20, and thus, the vibration member 20 may flexurally vibrate by the transferred stress. A vibration (for example, a sound) based on a voice signal may be generated by a vibration of the vibration member 20 based on the transferred stress.

Material of the vibration layer 112 and 222 is not particularly limited thereto, but may include ferroelectric ceramic, having good piezoelectric properties, such as lead zirconate titanate (PZT)-based materials or the like to increase the amount of displacement. As another example, material used as material of the vibration layer 112 and 122 may include a piezoelectric material of a ceramic-based material capable of implementing a relatively strong vibration. As another example, the vibration layer 112 and 122 may include a piezoelectric ceramic material having a perovskite-based crystal structure. Moreover, the vibration layer 112 and 222 may have a polycrystalline structure or a single-crystalline structure. For example, the vibration layer 112 and 222 may be configured as the polycrystalline ceramic or the single-crystalline ceramic. Furthermore, the vibration layer 112 and 222 may be configured as a PVDF (Polyvinylidene fluoride)-based material or material including a piezoelectric material including lead (Pb), or may be configured as a piezoelectric material not including lead (Pb). For example, the piezoelectric material including lead (Pb) may include one or more of a lead zirconate titanate (PZT)-based material, a lead zirconate nickel niobate (PZNN)-based material, a lead magnesium niobate (PMN)-based material, a lead nickel niobate (PNN)-based material, a lead zirconate niobate (PZN)-based material, or a lead indium niobate (PIN)-based material, but aspects of the present disclosure are not limited thereto. For example, the piezoelectric material without lead (Pb) may include one or more of barium titanate ($BaTiO_3$), calcium titanate ($CaTiO_3$), and strontium titanate ($SrTiO_3$), but aspects of the present disclosure are not limited thereto.

The adhesive layers 15 and 16 may be configured as a compressed resin material, an adhesive, or an adhesive tape or the like, but aspects of the present disclosure are not limited thereto. In addition, a lateral surface of each of the vibration devices may be covered by an insulator such as resin or the like to prevent an electrical short circuit between the vibration devices and the other members.

Material of the first electrode and the second electrode of each of the vibration devices 11 and 12 may include a transparent conductive material, a semitransparent conductive material, or an opaque conductive material. For example, as the transparent or semitransparent conductive material, the first electrode and the second electrode may include one or more of indium tin oxide (ITO) or indium zinc oxide (IZO). As the opaque conductive material, the first electrode and the second electrode may include one of an aluminum (Al), a copper (Cu), a gold (Au), a silver (Ag), a molybdenum (Mo), and a magnesium (Mg), or an alloy thereof, but aspects of the present disclosure are not limited thereto. For example, the protection layer 127 may be a polyimide (PI) film, a polyethylene terephthalate (PET) film, or polyethylene naphthalate (PEN) film, but aspects of the present disclosure are not limited thereto.

Figure 5:
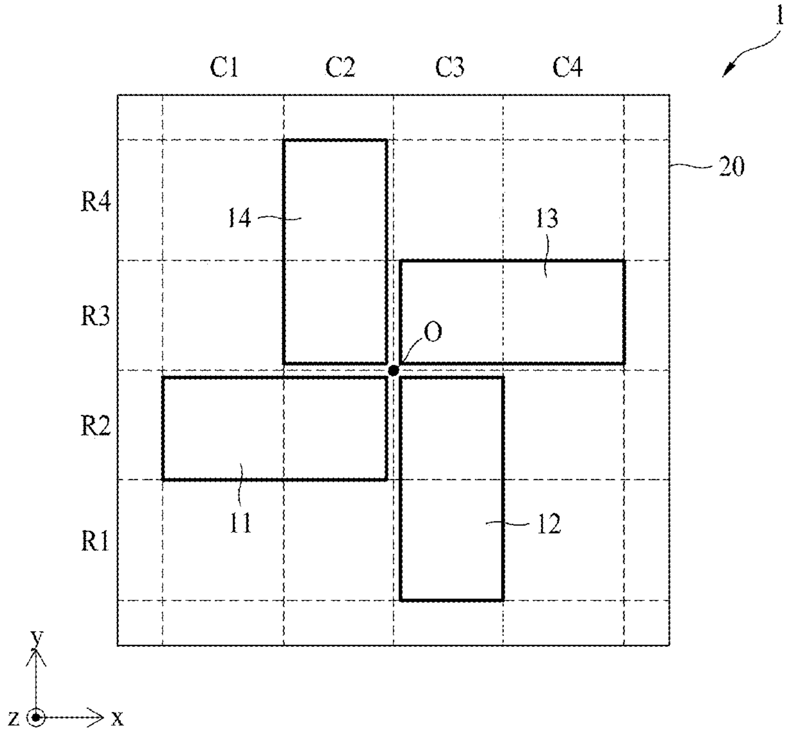
FIG. 5 illustrates a relationship between a division region and the amount of displacement of a vibration member in a plane of the sound apparatus according to a first aspect of the present disclosure.

FIG. 5 illustrates a relationship between a division region and the amount of displacement of a vibration member in a plane of the sound apparatus 1 according to an aspect of the present disclosure. Here, an aspect where a region, generating a sound, of the sound apparatus 1 is divided into or includes sixteen regions is illustrated. In the drawing, reference numerals R1 to R4 may refer to row numbers, and reference numerals C1 to C4 may refer to column numbers. Hereinafter, a division region may be referred to by (Rn, Cn). Here, n may be a natural number of 1 to 4.

In FIG. 5, a division region may be divided into first to third groups, based on a magnitude of an amplitude (the amount of displacement) when a driving signal is input thereto. The first group may include four division regions (R2, C2), (R2, C3), (R3, C2), and (R3, C3). Two vibration devices adjacent to one vibration device may be at the four division regions, and thus, stresses transferred from the vibration devices 11, 12, 13, and 14 to the vibration member 20 may be strongest. Therefore, in a division region included in the first group, the amount of displacement of the vibration member 20 may have a largest value among three groups, based on stresses transferred from the vibration devices 11, 12, 13, and 14 to the vibration member 20. For example, the vibration member 20 may vibrate in a Gaussian shape, based on the amount of displacement of the division region included in the first group, and thus, a sound pressure level characteristic of a specific pitched sound band (or a specific-order vibration mode) may increase.

The second group may include four division regions (R2, C1), (R1, C3), (R3, C4), and (R4, C2) except the first group among the regions, where the vibration devices 11, 12, 13, and 14 are provided, of the main surface of the vibration member (20). The third group may include eight division regions (R1, C1), (R1, C2), (R1, C4), (R2, C4), (R3, C1), (R4, C1), (R4, C3), and (R4, C4), where a vibration device is not provided, of the main surface of the vibration member 20. In the division region included in the third group, the amount of displacement of the vibration member 20 may have a smallest value among three groups. Moreover, in the division region included in the second group, the amount of displacement of the vibration member 20 may have a value which is smaller than the first group and greater than the third group, based on a stress transferred from each of the vibration devices 11, 12, 13, and 14 to the vibration member 20.

Figure 6:
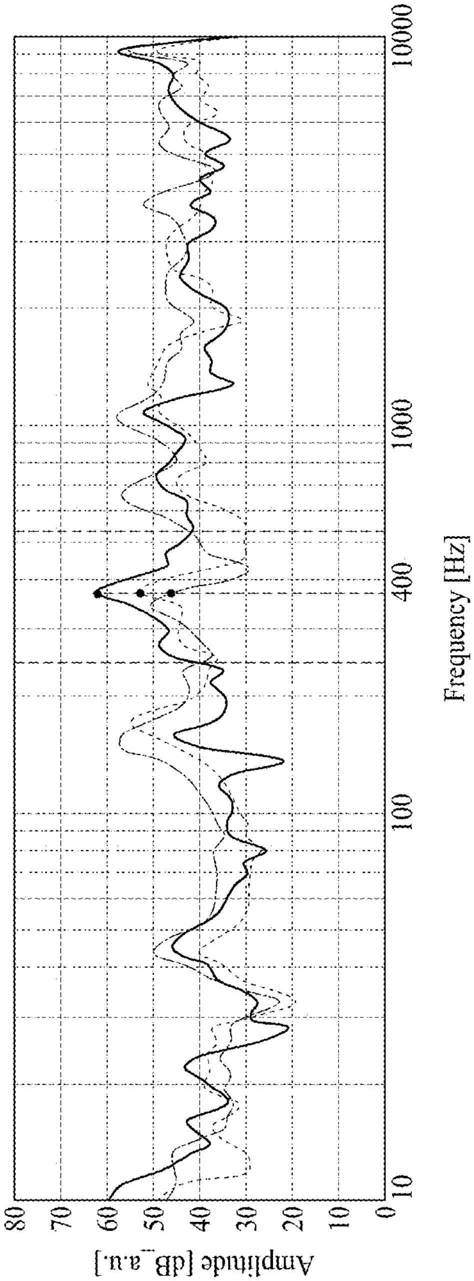
FIG. 6 is a graph illustrating a sound characteristic of the sound apparatus according to a first aspect of the present disclosure.

The enhancement of sound quality of the sound apparatus 1 according to an aspect of the present disclosure may be described with reference to real measurement data. FIG. 6 is a graph illustrating a sound characteristic of the sound apparatus according to an aspect of the present disclosure. In FIG. 6, the abscissa-axis represents a frequency (Hz) based on a log scale, and the ordinate-axis represents an amplitude (or a sound pressure level) based on a decibel (dB) unit. A curve illustrated by a solid line in FIG. 6 is a sound characteristic of the sound apparatus 1 according to an aspect of the present disclosure. A curve illustrated by a dotted line is a sound characteristic of a sound apparatus (hereinafter referred to as an experimental example 1) where four piezoelectric devices are arranged (or disposed) in a 2×2 two-layer structure on the main surface of the vibration member 20. A curve illustrated by a dash-single dotted line is a sound characteristic of a sound apparatus (hereinafter referred to as an experimental example 2) where two piezoelectric devices are arranged (or disposed) in parallel on the main surface of the vibration member 20.

In FIG. 6, comparing with three curves, in a configuration according to an aspect of the present disclosure, it may be seen that an amplitude is entirely smaller than a configuration of each of the experimental example 1 and the experimental example 2. However, in a frequency band (for example, a low-pitched sound region) of about 250 Hz to 500 Hz, it may be seen that a configuration according to an aspect of the present disclosure has an amplitude which is greater than the configuration of each of the experimental example 1 and the experimental example 2. In three curves, particularly, it may be seen that there is a large difference in value of an amplitude in a frequency of 370 Hz or more. For example, comparing with an experimental example, in the sound apparatus 1 according to an aspect of the present disclosure, it may be seen that a sound pressure level increases by about 10 dB or more in 370 Hz or more.

Moreover, based on the experiment described above, the inventor of the present disclosure has recognized that a displacement shape in a surface of the vibration member 20 represents a shape pattern such as a windmill in a three-dimensional (3D) coordinate system, when a vibration device disposed on the main surface of the vibration member 20 vibrates based on a driving signal input from a driving circuit. Further, the inventor of the present disclosure has recognized that an amplitude in a specific frequency band (for example, a low-pitched sound region) may be adjusted for each region of the main surface of the vibration member 20 by changing an arrangement pattern of the vibration member 20 based on a displacement shape in the main surface of the vibration member 20.

The sound apparatus 1 according to an aspect of the present disclosure, a short side of one vibration device of the vibration devices 11, 12, 13, and 14 may be opposite to a long side of another vibration device adjacent to the main surface of the vibration member 20. Thus, a position relationship between the vibration devices 11 to 14 and the vibration member 20 may form a plurality of regions capable of structurally adjusting an amplitude (or the amount of displacement) in the main surface of the vibration member 20.

Moreover, the vibration devices 11, 12, 13, and 14 may be connected to a common driving circuit in parallel, and thus, when the driving signal is input to the driving circuit, the vibration devices 11, 12, 13, and 14 may vibrate in synchronization with one another. Based on such a configuration, it may not be needed to individually control the vibration devices 11, 12, 13, and 14 by a special algorithm, and thus, the vibration devices 11, 12, 13, and 14 may be controlled by region units. For example, vibrations of the vibration devices 11, 12, 13, and 14 may be controlled by a common driving signal for each region, and thus, an increase in sound pressure level in a low-pitched sound region may be implemented.

In other words, a resonance frequency of a high-pitched sound region may be reduced, and a relatively flat frequency characteristic may be provided in a wide frequency band up to the high-pitched sound region from the low-pitched sound region. Accordingly, according to the sound apparatus 1 according to an aspect of the present disclosure, sound quality up to the high-pitched sound band from the low-pitched sound band may be enhanced. For example, the low-pitched sound band may be 200 Hz or less, 300 Hz or less, or 500 Hz or less, but aspects of the present disclosure are not limited thereto. For example, the high-pitched sound band may be 1 kHz or more, 2 kHz or more, or 3 kHz or more, but aspects of the present disclosure are not limited thereto.

Moreover, the vibration devices 11, 12, 13, and 14 may be disposed to be rotation-symmetric in a plane. Therefore, when the vibration devices 11, 12, 13, and 14 are driven (or displace or vibrate) by the driving signal, a stress may be transferred from each of the vibration devices 11, 12, 13, and 14 to the vibration member 20 under the same condition (or the same state), thereby enhancing sound quality.

Second Aspect

In an aspect of the present disclosure, a modification example of the structure of the sound apparatus 1 according to the first aspect of the present disclosure will be described. A structure of a vibration member 20 and each of the vibration devices 11, 12, 13, and 14 may be substantially a same as the first aspect of the present disclosure, and thus, descriptions may be omitted.

Figure 7:
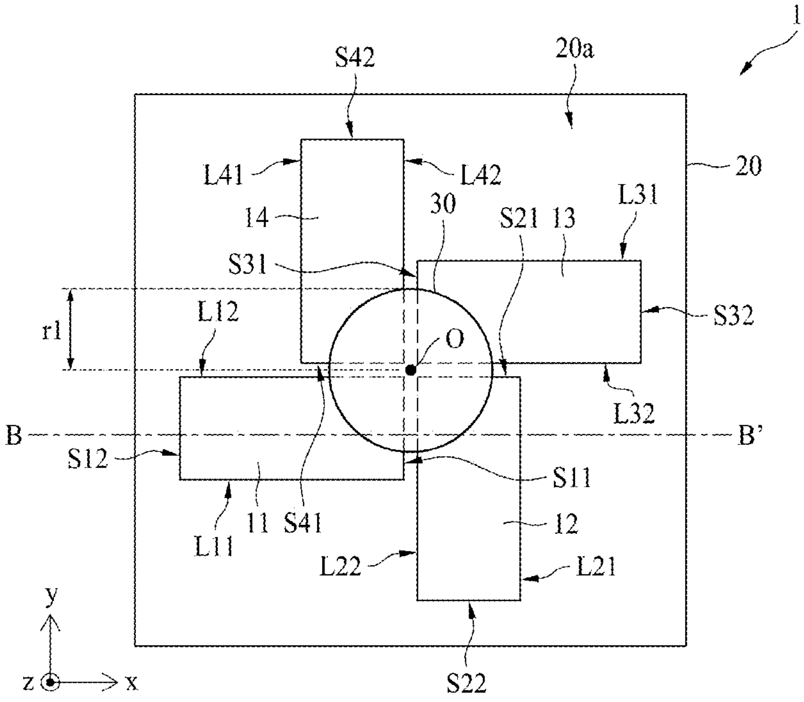
FIG. 7 is a plan view illustrating a configuration of a sound apparatus according to a second aspect of the present disclosure.
Figure 8:
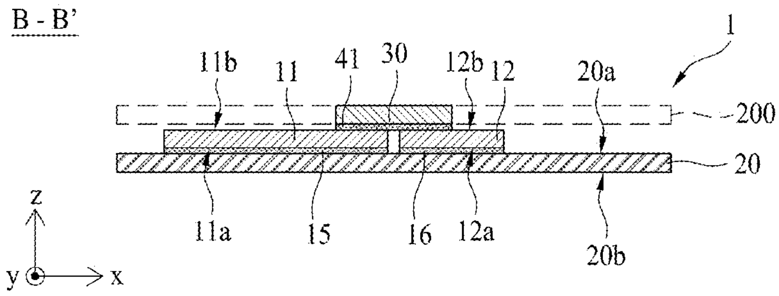
FIG. 8 is a cross-sectional view taken along line B-B' illustrated in FIG. 7 according to a second aspect of the present disclosure.

FIG. 7 is a plan view illustrating a configuration of a sound apparatus 1 according to an aspect of the present disclosure. FIG. 8 is a cross-sectional view taken along line B-B' of FIG. 7. A detailed configuration of the sound apparatus 1 according to an aspect of the present disclosure will be described with cross-reference to FIGS. 7 and 8.

As illustrated in FIGS. 7 and 8, the sound apparatus 1 according to an aspect of the present disclosure may differ from the sound apparatus 1 according to the first aspect of the present disclosure in that a mass member 30 having a circular shape is stacked over or all over four vibration devices 11, 12, 13, and 14.

The mass member (or weight member) 30 may be a circular plate having a certain (or a pre-defined) weight, but aspects of the present disclosure are not limited thereto. The mass member 30 may be a member which has a certain (or a pre-defined) weight and is configured to lower a resonance frequency in the sound apparatus 1. The mass member 30 may be configured a material such as, for example, metal, resin, glass, hard paper, wood, rubber, plastic, fiber, cloth, paper, leather, or carbon or the like, but aspects of the present disclosure are not limited thereto. In an aspect of the present disclosure, the mass member 30 may be a metal plate. For example, an example of metal that may be configured as the mass member 30 may be used stainless steel, but aspects of the present disclosure are not limited thereto.

Moreover, in a plane, a center of the mass member 30 may match or correspond to a rotation-symmetric center (a symmetric central point O) of the vibration devices 11, 12, 13, and 14. Sizes of the vibration devices 11, 12, 13, and 14 may be uniform. Accordingly, the mass member 30 may contact each of the vibration devices 11, 12, 13, and 14 under a same condition (or a same state). The mass member 30 may be connected to each of the vibration devices 11, 12, 13, and 14 by an adhesive member 41. The adhesive member 41 may be disposed between the mass member 30 and each of the vibration devices 11, 12, 13, and 14. For example, the adhesive member 41 may be similar to the adhesive member 15 described above with reference to FIG. 4 of the first aspect of the present disclosure, and thus, its detailed description may be omitted.

Moreover, a radius r1 of the mass member 30 may be shorter than a length of each of short sides S11, S21, S31, and S41 of the vibration devices 11, 12, 13, and 14. Accordingly, the mass member 30 of an aspect of the present disclosure may contact partial portions (or some portions) of four division regions (R2, C2), (R2, C3), (R3, C2), and (R3, C3) in the first group described above with reference to FIG. 5 of the first aspect of the present disclosure. For example, the mass member 30 may overlap partial portions (or some portions) of four division regions (R2, C2), (R2, C3), (R3, C2), and (R3, C3) in the first group described above with reference to FIG. 5 of the first aspect of the present disclosure.

When an alternating current (AC) voltage is applied between a first electrode and a second electrode of each of the vibration devices 11, 12, 13, and 14, each vibration layer may expand and/or contract, and a periodic stress may be applied (or transferred) to the vibration member 20 positioned at a first main surface side (a sub-direction of a z-axis in the drawing) of the vibration device. A vibration and/or a sound based on a voice signal may be generated by a flexurally vibration of the vibration member 20 based on the applied (or transferred) stress.

According to the sound apparatus 1 according to an aspect of the present disclosure, the mass member 30 may be configured in a certain (or a pre-defined) division region of a second main surface of each of the vibration devices 11, 12, 13, and 14, and thus, a resonance frequency of the entire sound apparatus 1 may be lowered. In detail, a resonance frequency of a high-pitched sound region may be lowered, and a relatively flat frequency characteristic (or flatness characteristic) may be provided in a wide frequency sound band up to the high-pitched sound region from the low-pitched sound region. For example, the sound apparatus 1 where a flatness characteristic of a sound is enhanced may be provided. Accordingly, according to the sound apparatus 1 according to an aspect of the present disclosure, sound quality may be enhanced.

Moreover, in an aspect of the present disclosure, a metal plate applying a load to each of the vibration devices 11, 12, 13, and 14 in the sub-direction direction of the z-axis may configure the mass member 30, but the mass member 30 is not limited to only the metal plate. For example, a vibration control sheet (or vibration damping sheet or a vibration absorbing sheet) which absorbs a vibration of each of the vibration devices 11, 12, 13, and 14 may be configured as the mass member 30. The vibration control sheet may be, for example, a resin material. In addition, as illustrated by a dotted line in FIG. 8, a passive panel 200, in which the member itself resonates based on a vibration of each of a plurality of vibration devices may be used as the mass member 30. The passive panel 200 may be metal, but aspects of the present disclosure are not limited thereto. For example, the mass member 30 may be configured at a center portion of each of the vibration devices 11, 12, 13, and 14, and thus, a weight at the center portion of each of the vibration devices 11, 12, 13, and 14 may increase. Accordingly, a sound pressure level characteristic and/or a sound characteristic of a low-pitched sound band may be enhanced.

Third Aspect

In an aspect of the present disclosure, a modification example of the structure of the sound apparatus 1 according to the first aspect of the present disclosure will be described. A structure of a vibration member 20 and vibration devices 11, 12, 13, and 14 may be substantially a same as the first aspect of the present disclosure, and thus, descriptions are omitted and a difference with the second aspect of the present disclosure will be mainly described below.

Figure 9:
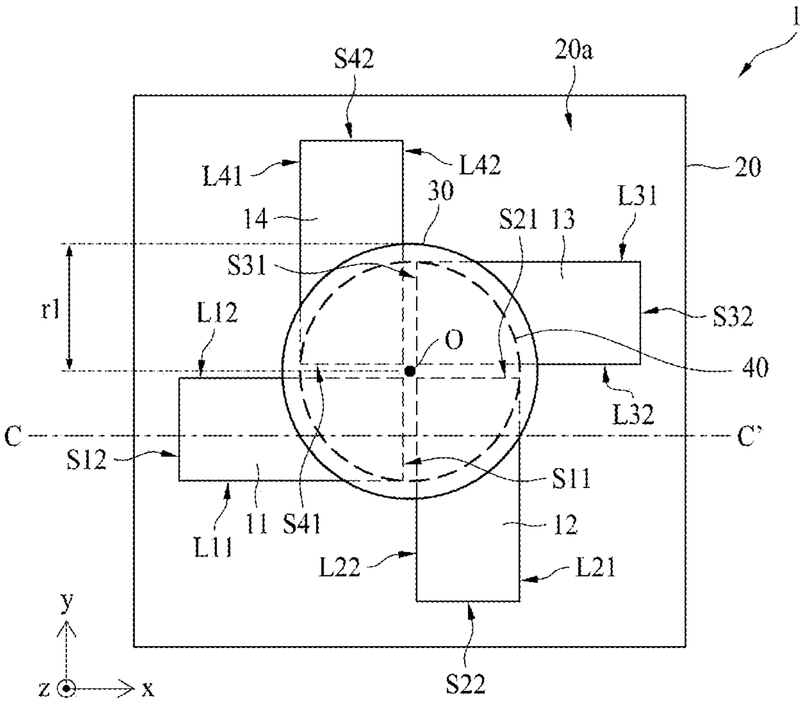
FIG. 9 is a cross-sectional view illustrating a configuration of a sound apparatus according to a third aspect of the present disclosure.
Figure 10:
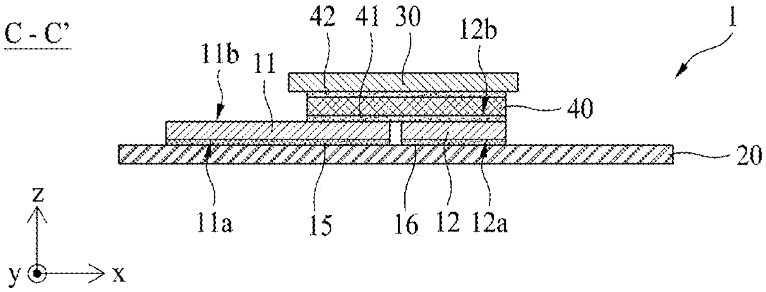
FIG. 10 is a cross-sectional view taken along line C-C' illustrated in FIG. 9 according to a third aspect of the present disclosure.

FIG. 9 is a plan view illustrating a configuration of a sound apparatus 1 according to an aspect of the present disclosure. FIG. 10 is a cross-sectional view taken along line C-C' of FIG. 9 according to an aspect of the present disclosure. A detailed configuration of the sound apparatus 1 according to an aspect of the present disclosure will be described with cross-reference to FIGS. 9 and 10.

As illustrated in FIGS. 9 and 10, a sound apparatus 1 according to an aspect of the present disclosure may differ from the sound apparatus 1 according to the second aspect of the present disclosure in that a radius of a mass member 30 increases and an elastic member 40 is provided between the mass member 30 and each vibration device.

In a plane, the mass member 30 may have a circular shape. For example, the mass member 30 may be a circular plate having a certain (or a pre-defined) weight, but aspects of the present disclosure are not limited thereto. Moreover, a center of the mass member 30 may match or correspond to a rotation-symmetric center (a symmetric central point O) of the vibration devices 11, 12, 13, and 14. A radius r2 of the mass member 30 may be longer than short sides S11, S21, S31, and S41 of the vibration devices 11, 12, 13, and 14 and may be shorter than long sides L12, L22, L32, and L42 of the vibration devices 11, 12, 13, and 14.

The elastic member 40 may each be connected to the mass member 30 and the vibration devices 11, 12, 13, and 14 through adhesive members 41 and 42 (or an adhesive layer). The elastic member 40 may be connected to the mass member 30 and the vibration devices 11, 12, 13, and 14 through the adhesive member 41. The elastic member 40 may be connected to the mass member 30 through the adhesive member 42. The adhesive members 41 and 42 may include a soft adhesive material, or may include a hard adhesive material. The elastic member 40 may be configured by using, for example, a material such as resin or the like, but aspects of the present disclosure are not limited thereto. An example of resin that may be configured as the elastic member 40 may be used polyurethane or polyethylene terephthalate PET, but aspects of the present disclosure are not limited thereto. At least a portion of the elastic member 40 may have a hexahedral shape. For example, the clastic member 40 may have a rectangular shape in a plane and a cross-sectional view. At least a portion of the elastic member 40 may have a circular pillar shape or an oval pillar shape. For example, the elastic member 40 may be circular or oval in a plane, or may have a rectangular shape in a cross-sectional view. The elastic member 40 may be a transfer member or a vibration transfer member which transfers a vibration, generated by each of the vibration devices 11, 12, 13, and 14, to the mass member 30, based on a driving signal input thereto.

When an alternating current (AC) voltage is applied between a first electrode and a second electrode of each of the vibration devices 11, 12, 13, and 14, each vibration layer may expand and contract, and a periodic stress may each be applied (or transferred) to the elastic member 40 and the mass member 30 positioned at a second main surface side (a forward direction of the z-axis in the drawing) of the vibration member 20 positioned at a second main surface side (a sub-direction of a z-axis in the drawing) of each of the vibration devices 11, 12, 13, and 14. A vibration and/or a sound based on a voice signal may be generated by a flexurally vibration of the vibration member 20 based on the applied (or transferred) stress.

Comparing with the second aspect of the present disclosure, in the sound apparatus 1 according to an aspect of the present disclosure, a radius of the mass member 30 may be longer, and an area contacting the vibration devices 11, 12, 13, and 14 may be widened. Accordingly, the sound apparatus 1 according to an aspect of the present disclosure may control a resonance frequency of the sound apparatus 1 within a range which is wider than the second aspect of the present disclosure.

Moreover, an elastic member 40 may be configured between the mass member 30 and each of the vibration devices 11, 12, 13, and 14, and thus, a resonance frequency of the entire sound apparatus 1 may be further appropriately lowered. In detail, a resonance frequency of a high-pitched sound region may be lowered, and a relatively flat frequency characteristic may be provided in a wide frequency sound band up to the high-pitched sound region from the low-pitched sound region. For example, the sound apparatus 1 where a flatness characteristic of a sound is enhanced may be provided. Accordingly, according to the sound apparatus 1 according to an aspect of the present disclosure, sound quality may be enhanced.

Fourth Aspect

In an aspect of the present disclosure, a modification example of the structure of the sound apparatus 1 according to the second aspect of the present disclosure will be described. A structure of a vibration member 20 and vibration devices 11, 12, 13, and 14 may be substantially a same as the first aspect of the present disclosure, and thus, descriptions are omitted and a difference with the second aspect of the present disclosure will be mainly described below.

Figure 11A:
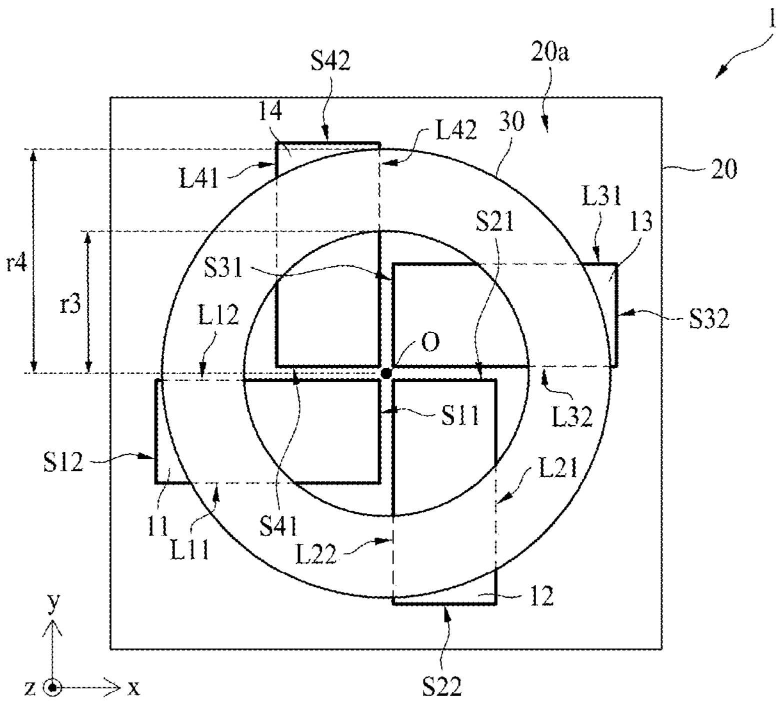
FIG. 11A is a plan view illustrating a configuration of a sound apparatus according to a fourth aspect of the present disclosure.
Figure 11B:
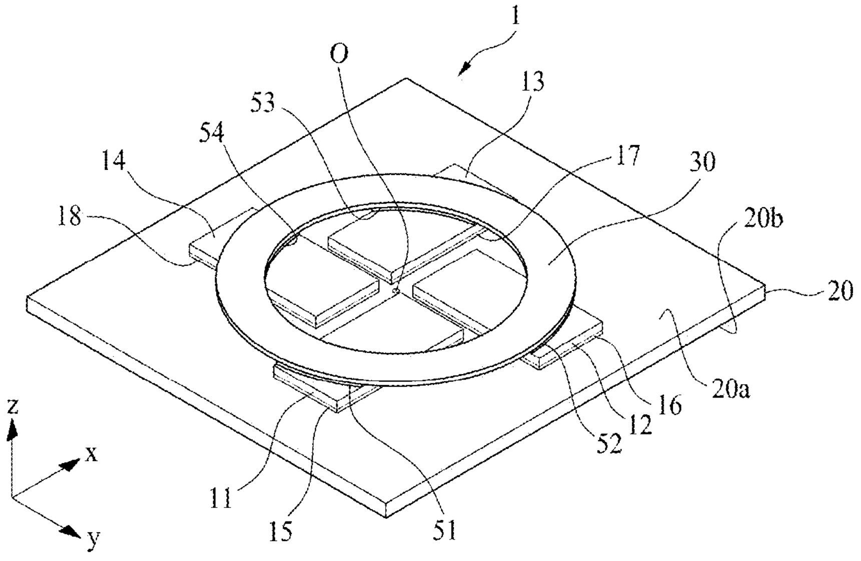
FIG. 11B is a perspective view illustrating a configuration of a sound apparatus according to a fourth aspect of the present disclosure.

FIG. 11A is a plan view illustrating a configuration of a sound apparatus according to an aspect of the present disclosure. FIG. 11B is a perspective view illustrating a configuration of a sound apparatus according to an aspect of the present disclosure. As illustrated in FIGS. 11A and 11B, a sound apparatus 1 according to an aspect of the present disclosure may differ from the sound apparatus 1 according to the second aspect of the present disclosure in that the mass member 30 has a circular ring shape and positions, at which the mass member 30 is stacked on second main surfaces of four vibration devices 11, 12, 13, and 14, are defined as division regions in an outer circumference direction.

Moreover, in a plane, a center of the mass member 30 may match or correspond to a rotation-symmetric center (a symmetric central point O) of the vibration devices 11, 12, 13, and 14. For example, the mass member 30 may be connected to each of the vibration devices 11, 12, 13, and 14 by adhesive members 51, 52, 53, and 54. The adhesive members 51, 52, 53, and 54 may be disposed between the mass member 30 and each of the vibration devices 11, 12, 13, and 14. For example, the adhesive members 51, 52, 53, and 54 may be similar to the adhesive member 15 described above with reference to FIG. 4 of the first aspect of the present disclosure, and thus, its detailed description may be omitted.

Moreover, in a plane, an inner circumference (or inner) radius r3 of the mass member 30 may be longer than short sides S11, S21, S31, and S41 of the vibration devices 11, 12, 13, and 14. Furthermore, an outer circumference radius r4 of the mass member 30 may be shorter than long sides L12, L22, L32, and L42 of the vibration devices 11, 12, 13, and 14. Accordingly, the mass member 30 according to an aspect of the present disclosure may contact partial portions (or some portions) of four division regions (R2, C1), (R1, C3), (R3, C4), and (R4, C2) in the second group described above with reference to FIG. 5 of the first aspect of the present disclosure. The mass member 30 may contact each of the vibration devices 11, 12, 13, and 14 under a same condition (or a same state).

In a plane, the inner circumference of the mass member 30 and the outer circumference of the mass member 30 may be disposed on a concentric circle from a symmetric central point O. For example, the mass member 30 may include a circular ring (or round ring or orbicular) shape or a ring shape, but aspects of the present disclosure are not limited thereto. For example, the mass member 30 may include a ring shape including a hollow hole having an inner circumference radius r3. For example, the mass member 30 may include a circular ring shape having the inner circumference radius r3, but aspects of the present disclosure are not limited thereto.

According to the sound apparatus 1 according to an aspect of the present disclosure, the mass member 30 may be configured in a certain (or a pre-defined) division region of a second main surface of each of the vibration devices 11, 12, 13, and 14, and thus, a resonance frequency of the entire sound apparatus 1 may be lowered. In detail, a resonance frequency of a high-pitched sound region may be lowered, and a relatively flat frequency characteristic may be provided in a wide frequency sound band up to the high-pitched sound region from the low-pitched sound region. For example, the sound apparatus 1 where a flatness characteristic of a sound is enhanced may be provided. Accordingly, according to the sound apparatus 1 according to an aspect of the present disclosure, sound quality may be enhanced.

Fifth Aspect

In an aspect of the present disclosure, a modification example of the structure of the sound apparatus 1 according to the first aspect of the present disclosure will be described. A structure of a vibration member 20 and vibration devices 11, 12, 13, and 14 may be substantially a same as the first aspect of the present disclosure, and thus, descriptions are omitted and a difference with the second aspect of the present disclosure will be mainly described below.

Figure 12A:
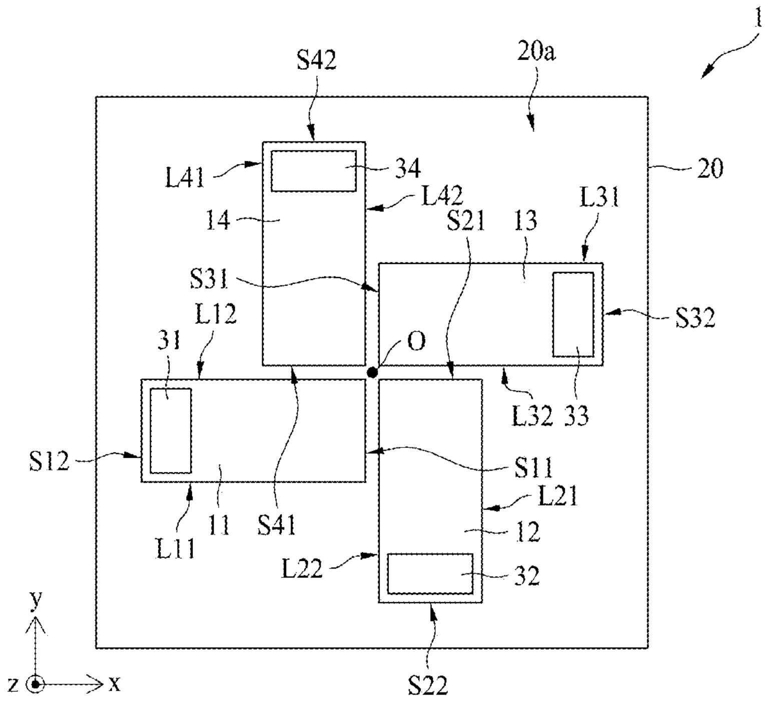
FIG. 12A is a plan view illustrating a configuration of a sound apparatus according to a fifth aspect of the present disclosure.
Figure 12B:
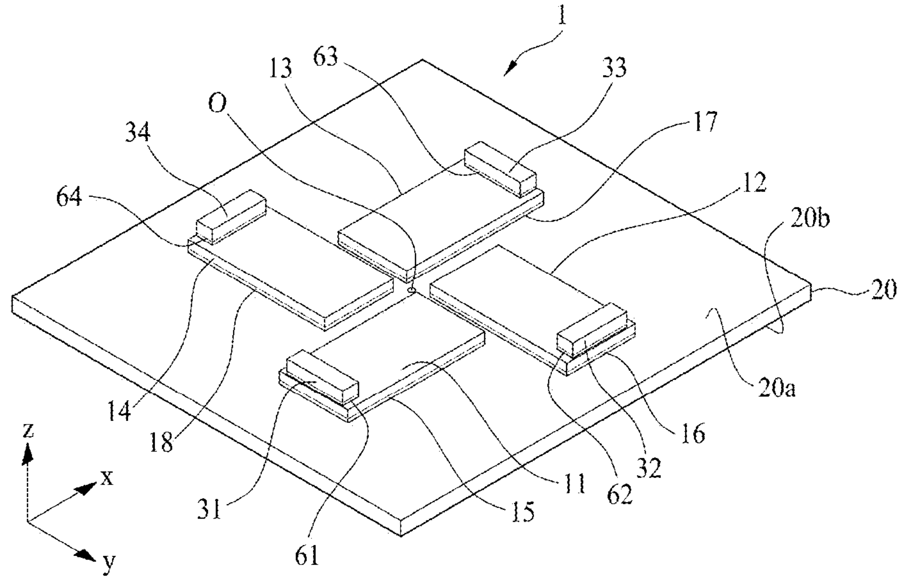
FIG. 12B is a perspective view illustrating a configuration of a sound apparatus according to a fifth aspect of the present disclosure.

FIG. 12A is a plan view illustrating a configuration of a sound apparatus according to an aspect of the present disclosure. FIG. 12B is a perspective view illustrating a configuration of a sound apparatus according to an aspect of the present disclosure. As illustrated in FIGS. 12A and 12B, a sound apparatus 1 according to an aspect of the present disclosure may differ from the sound apparatus 1 according to the second aspect of the present disclosure in that mass members 31, 32, 33, and 34 are respectively stacked on vibration devices 11, 12, 13, and 14.

The mass members 31, 32, 33, and 34 may be disposed near short sides S12, S22, S32, and S42, which are not opposite to vibration devices 11, 12, 13, and 14, of a pair of short sides of each of vibration devices 11, 12, 13, and 14. Moreover, in a plane, a center of each of the mass members 31, 32, 33, and 34 may be disposed on a concentric circle from a symmetric central point O.

In a plane, the mass members 31, 32, 33, and 34 may be disposed near short sides S12, S22, S32, and S42, which are not opposite to vibration devices 11, 12, 13, and 14, of a pair of short sides of each of vibration devices 11, 12, 13, and 14. For example, the mass members 31, 32, 33, and 34 may each be disposed at edge portions (or periphery portions) of vibration devices 11, 12, 13, and 14 adjacent a side (or an outer wall) of the vibration member 20. For example, the mass members 31, 32, 33, and 34 may each be disposed at the edge portions (or periphery portions) of vibration devices 11, 12, 13, and 14 at a region between the side (or an outer wall) of the vibration member 20 and a center of the vibration devices 11, 12, 13, and 14.

Each of the mass members 31, 32, 33, and 34 may be connected to each of the vibration devices 11, 12, 13, and 14 by adhesive members 61, 62, 63, and 64. The adhesive members 61, 62, 63, and 64 may be disposed between each of the mass member 31 to 34 and each of the vibration devices 11 to 14. For example, the adhesive members 61, 62, 63, and 64 may be similar to the adhesive member 15 described above with reference to FIG. 4 of the first aspect of the present disclosure, and thus, its detailed description may be omitted.

According to the sound apparatus 1 according to an aspect of the present disclosure, the mass members 31, 32, 33, and 34 may be configured in a certain (or a pre-defined) division region of a second main surface of each of the vibration devices 11, 12, 13, and 14, and thus, a resonance frequency of the entire sound apparatus 1 may be lowered. In detail, a resonance frequency of a high-pitched sound region may be lowered, and a relatively flat frequency characteristic may be provided in a wide frequency sound band up to the high-pitched sound region from the low-pitched sound region. For example, the sound apparatus 1 where a flatness characteristic of a sound is enhanced may be provided. Accordingly, according to the sound apparatus 1 according to an aspect of the present disclosure, sound quality may be enhanced.

Sixth Aspect

In an aspect of the present disclosure, a modification example of the structure of the sound apparatus 1 according to the first aspect of the present disclosure will be described. A structure of a vibration member 20 and vibration devices 11, 12, and 13 may be substantially a same as the first aspect of the present disclosure, and thus, descriptions are omitted.

Figure 13A:
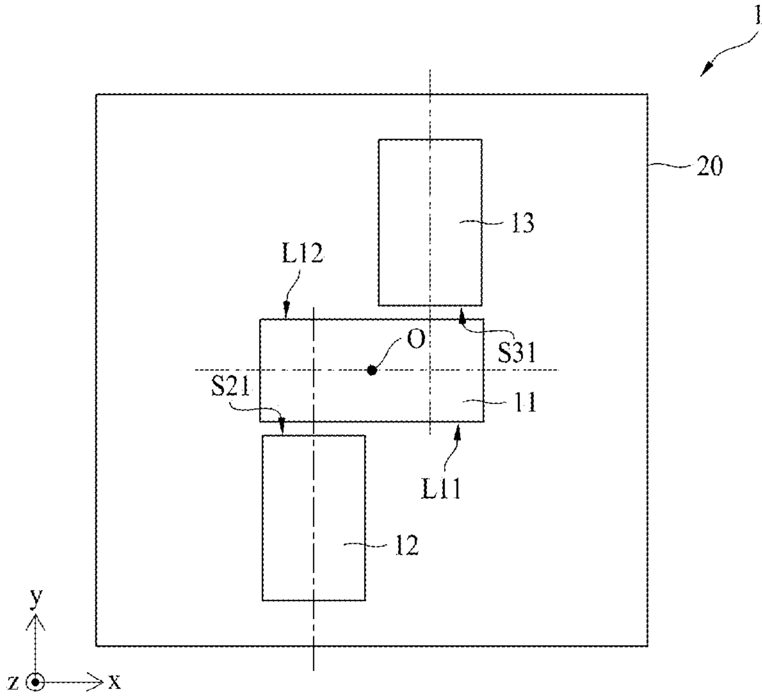
FIG. 13A is a plan view illustrating a configuration of a sound apparatus according to a sixth aspect of the present disclosure.
Figure 13B:
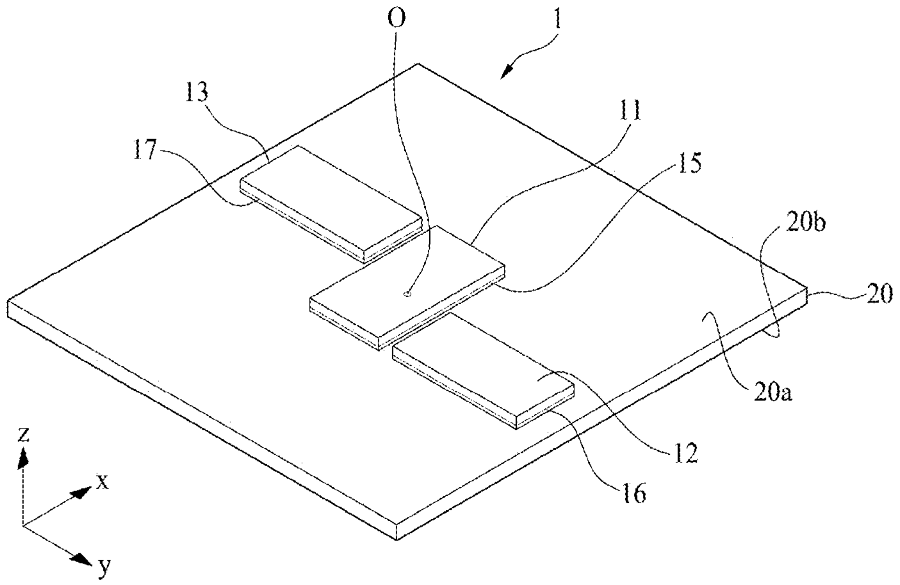
FIG. 13B is a perspective view illustrating a configuration of a sound apparatus according to a sixth aspect of the present disclosure.

FIG. 13A is a plan view illustrating a configuration of a sound apparatus according to an aspect of the present disclosure. FIG. 13B is a perspective view illustrating a configuration of a sound apparatus according to an aspect of the present disclosure. As illustrated in FIGS. 13A and 13B, a sound apparatus 1 according to an aspect of the present disclosure may differ from the sound apparatus 1 according to the second aspect of the present disclosure in that the number of vibration devices are three and a plurality of vibration devices are provided.

In a plane, a vibration device 11 may not be disposed to be rotation-symmetric. Meanwhile, vibration devices 12 and 13 may be disposed to be rotation-symmetric with respect to a symmetric central point O of a vibration member 20. Moreover, the vibration device 12 and the vibration device 13 may be disposed so that a center line in a long-axis direction (a y-axis direction in the drawing) illustrated by a dash-single dotted line is offset with respect to the symmetric central point O. A short side S21 of the vibration device 12 may be opposite to a long side L11 of the vibration device 11, and a short side S31 of the vibration device 13 may be opposite to a long side L12 of the vibration device 11. For example, a center of the vibration device 11 may match or correspond to the symmetric central point O of the vibration member 20. A long-axis direction of the vibration device 11 may be disposed in parallel with an x axis and may intersect with a long-axis direction of each of the vibration devices 12 and 13. For example, the long-axis direction of each of the vibration devices 12 and 13 may be disposed in parallel with a y axis and may be disposed in parallel without matching or corresponding to each other. For example, a center of the vibration device 11 may be disposed to be offset between long-axis directions of the vibration devices 12 and 13. For example, each of the vibration devices 11, 12, and 13 may be connected to the vibration member 20 by adhesive members 15, 16, and 17. The adhesive members 15, 16, and 17 may be disposed between a first main surface 20*a* of the vibration member 20 and each of the vibration devices 11, 12, and 13. For example, the adhesive members 15, 16, and 17 may be similar to the adhesive members 15, 16, and 17 described above with reference to FIG. 4 of the first aspect of the present disclosure, and thus, its detailed description may be omitted.

According to the sound apparatus 1 according to an aspect of the present disclosure, like the first aspect of the present disclosure, a resonance frequency of the entire sound apparatus 1 may be lowered based on the arrangement of a plurality of vibration devices 11 to 13 at a main surface of the vibration member 20. Accordingly, according to the sound apparatus 1 according to an aspect of the present disclosure, sound quality may be enhanced.

Seventh Aspect

In an aspect of the present disclosure, a modification example of the structure of the sound apparatus 1 according to the first aspect of the present disclosure will be described. A structure of a vibration member 20 and vibration devices 11, 12, and 13 may be substantially a same as the first aspect of the present disclosure, and thus, descriptions are omitted.

Figure 14A:
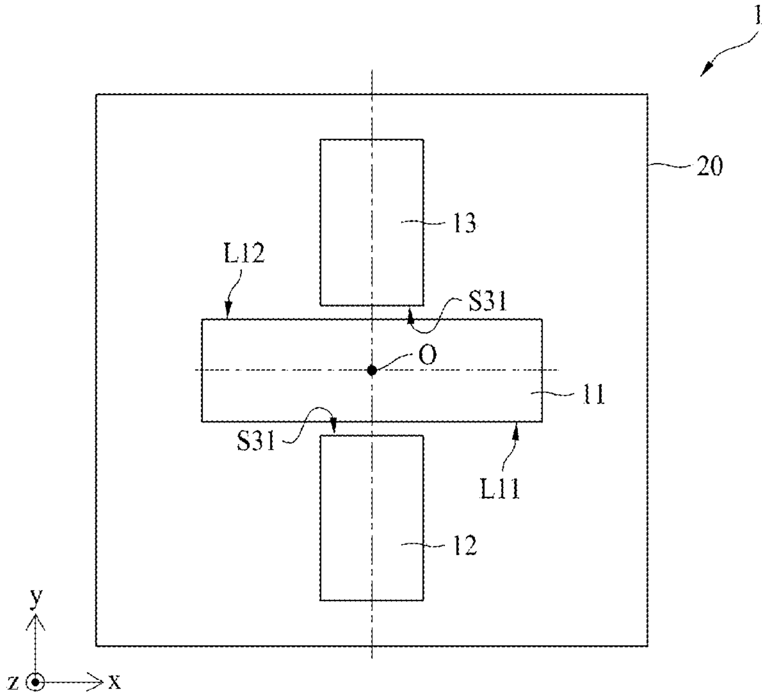
FIG. 14A is a plan view illustrating a configuration of a sound apparatus according to a seventh aspect of the present disclosure.
Figure 14B:
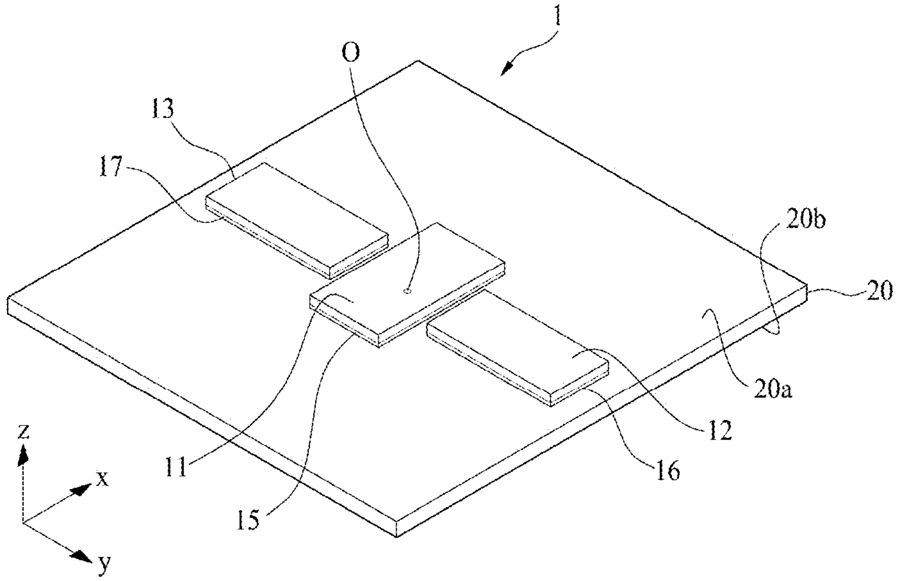
FIG. 14B is a perspective view illustrating a configuration of a sound apparatus according to a seventh aspect of the present disclosure.

FIG. 14A is a plan view illustrating a configuration of a sound apparatus according to an aspect of the present disclosure. FIG. 14B is a perspective view illustrating a configuration of a sound apparatus according to a seventh aspect of the present disclosure. As illustrated in FIGS. 14A and 14B, a sound apparatus 1 according to an aspect of the present disclosure may differ from the sound apparatus 1 according to the first aspect of the present disclosure in that the number of vibration devices are three and a plurality of vibration devices are provided.

In a plane, the vibration devices 12 and 13 may be disposed to be rotation-symmetric with respect to a symmetric central point O of each of a vibration device 11 and a vibration member 20. Moreover, the vibration device 12 and the vibration device 13 may be disposed so that a center line in a long-axis direction (a y-axis direction in the drawing) illustrated by a dash-single dotted line passes through the symmetric central point O of the vibration device 11. A short side S21 of the vibration device 12 may be opposite to a long side L11 of the vibration device 11, and a short side S31 of the vibration device 13 may be opposite to a long side L12 of the vibration device 11. For example, a center of the vibration device 11 may match or correspond to the symmetric central point O of the vibration member 20. A long-axis direction of the vibration device 11 may be disposed in parallel with an x axis and may intersect with a long-axis direction of each of the vibration devices 12 and 13. For example, the long-axis direction of each of the vibration devices 12 and 13 may be disposed in parallel with a y axis and may match or correspond to each other. For example, the long-axis direction of each of the vibration devices 12 and 13 may be disposed to pass through a center of the vibration device 11 and the symmetric central point O of the vibration member 20. For example, each of the vibration devices 11, 12, and 13 may be connected to the vibration member 20 by adhesive members 15, 16, and 17. The adhesive members 15, 16, and 17 may be disposed between a first main surface 20*a* of the vibration member 20 and each of the vibration devices 11, 12, and 13. For example, the adhesive members 15, 16, and 17 may be similar to the adhesive members 15, 16, and 17 described above with reference to FIG. 4 of the first aspect of the present disclosure, and thus, its detailed description may be omitted.

According to the sound apparatus 1 according to an aspect of the present disclosure, like the first aspect of the present disclosure, a resonance frequency of the entire sound apparatus 1 may be lowered based on the arrangement of a plurality of vibration devices 11 to 13 at a main surface of the vibration member 20. Accordingly, according to the sound apparatus 1 according to an aspect of the present disclosure, sound quality may be enhanced.

Eighth Aspect

Figure 15:
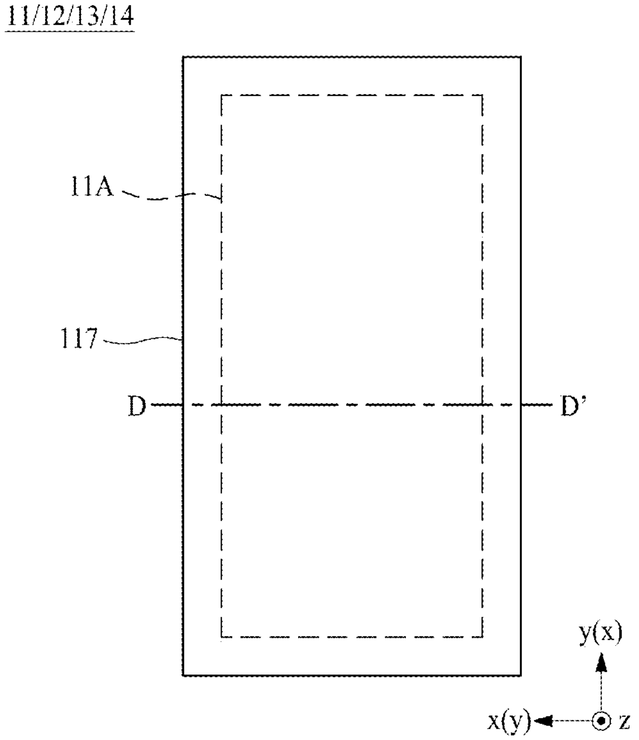
FIG. 15 is a perspective view illustrating a structure of a vibration device according to an eighth aspect of the present disclosure.
Figure 16:
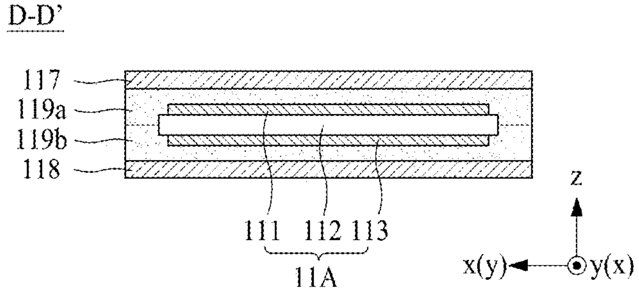
FIG. 16 is a cross-sectional view taken along line D-D' illustrated in FIG. 15 according to an eighth aspect of the present disclosure.

In an aspect of the present disclosure, a modification example of a structure of a vibration device in the sound apparatus 1 according to the eighth aspect of the present disclosure will be described. FIG. 15 is a plan view illustrating a configuration of a vibration device according to an eighth aspect of the present disclosure. FIG. 16 is a cross-sectional view along D-D' of FIG. 15 according to an eighth aspect of the present disclosure.

As illustrated in FIGS. 15 and 16, each of vibration devices 11, 12, 13, and 14 according to an aspect of the present disclosure may include a vibration generating part (or vibration part) 11A.

The vibration generating part 11A may include a vibration layer 112, a first electrode 111 at a first surface of the vibration layer 112, and a second electrode 113 at a second surface different from the first surface of the vibration layer 112. The vibration layer 112 may be substantially a same as the vibration layer 112 described in FIG. 4, and thus, repeated descriptions are omitted. The first electrode 111 and the second electrode 113 may be disposed with the vibration layer 112 therebetween in a thickness direction, and the first electrode 111 and the second electrode 113 may apply a voltage to the vibration layer 112. A polarization direction of the vibration layer 112 may be a forward direction (or a positive direction) of the z-axis or a sub-direction (or a negative direction) of the z-axis. Moreover, wires (or lines)

for applying a voltage to each electrode may be connected to the electrodes 111 and 113.

Each of the vibration devices 11, 12, 13, and 14 according to an aspect of the present disclosure may further include a first protection layer (or first protection member) 117 and a second protection layer (or second protection member) 118. The first protection layer 117 may be connected to a first surface (or front surface or upper surface) of the vibration generating part 11A. The first protection layer 117 may protect and insulate the first surface of the vibration generating part 11A. The second protection layer 118 may be connected to a second surface (or rear surface or lower surface) of the vibration generating part 11A. The second protection layer 118 may protect and insulate the second surface of the vibration generating part 11A. For example, any one of the first protection layer 117 and the second protection layer 118 in the vibration devices 11, 12, 13, and 14 may be connected to the vibration member through adhesive layers 119*a* and 119*b*. For example, the adhesive layers 119*a* and 119*b* may be configured in an adhesive resin material, an adhesive, or an adhesive tape, or the like, but aspects of the present disclosure are not limited thereto. The adhesive layers 119*a* and 119*b* may include epoxy-based, acryl-based, silicone-based, or urethane-based, but aspects of the present disclosure are not limited thereto.

The first protection layer 117 may be connected or coupled to the first electrode 111 by a first adhesive layer 119*a*. The second protection layer 118 may be connected or coupled to the second electrode 113 by a second adhesive layer 119*b*. The first adhesive layer 119*a* and the second adhesive layer 119*b* may be configured at a region between the first protection layer 117 and the second protection layer 118 to completely surround the vibration generating part 11A. For example, the vibration generating part 11A may be embedded or built-in at a region between the first adhesive layer 119*a* and the second adhesive layer 119*b*. For example, the first adhesive layer 119*a* and the second adhesive layer 119*b* may be a polyimide (PI) film, a polyethylene terephthalate (PET) film, or polyethylene naphthalate (PEN) film, but aspects of the present disclosure are not limited thereto.

Ninth Aspect

Figure 17:
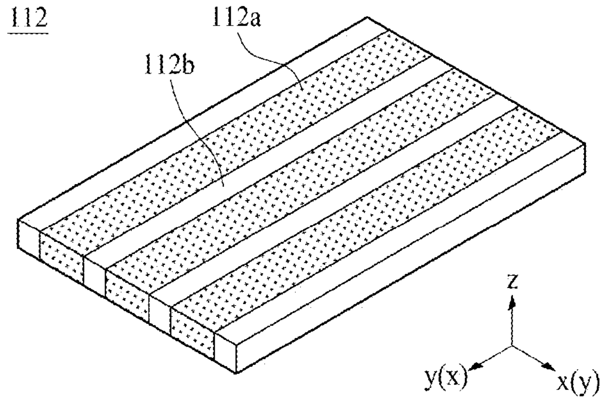
FIG. 17 is a perspective view illustrating a vibration layer of a vibration device according to a ninth aspect of the present disclosure.

In an aspect of the present disclosure, a modification example of the structure of a vibration layer in the vibration device of the sound apparatus 1 according to the fifth aspect of the present disclosure will be described. FIG. 17 is a perspective view illustrating a vibration layer in a vibration device of the sound apparatus according to an aspect of the present disclosure.

As illustrated in FIG. 17, in each of the vibration devices 11, 12, 13, and 14 according to an aspect of the present disclosure, a vibration layer 112 of a vibration generating part 11A may include a plurality of first portions 112*a* and one or more second portions 112*b*. For example, the vibration layer 112 may include a plurality of first portions 112*a* and a plurality of second portions 112*b* between the plurality of first portions 112*a*. For example, the plurality of first portions 112*a* and the plurality of second portions 112*b* may be alternately and repeatedly disposed along an x-axis direction, but aspects of the present disclosure are not limited thereto.

Each of the plurality of first portions 112*a* may include an inorganic material having a piezoelectric characteristic. For example, each of the plurality of first portions 112*a* may be an inorganic material portion or a piezoelectric material portion. Each of the plurality of first portions 112*a* may have a first width parallel to the along the x-axis direction and may be extended along a y-axis direction. Each of the plurality of first portions 112*a* may be substantially a same as the vibration layer 112 described above with reference to FIG. 4, and thus, repeated descriptions may be omitted.

Each of the plurality of second portions 112*b* may be disposed at a region between the plurality of first portions 112*a*. For example, each of the plurality of first portions 112*a* may be disposed at a region between two adjacent second portions 112*b* of the plurality of second portions 112*b*. For example, the plurality of first portions 112*a* and the plurality of second portions 112*b* may include a line shape or a stripe shape which has a same size or different sizes.

Each E of the plurality of second portions 112*b* may be configured to fill a gap between two adjacent first portions of the plurality of first portions 112*a*. Each of the plurality of first portions 112*a* and the plurality of second portions 112*b* may be disposed (or arranged) at a same plane (or a same layer) in parallel with each other. Each of the plurality of second portions 112*b* may absorb an impact applied to the first portions 112*a*, and thus, may enhance the durability of the first portions 112*a* and provide flexibility to the vibration devices 11, 12, 13, and 14. Each of the plurality of second portions 112*b* may include an organic material having a ductile characteristic. For example, each of the plurality of second portions 112*b* may include one or more of an epoxy-based polymer, an acrylic-based polymer, and a silicone-based polymer, but aspects of the present disclosure are not limited thereto. For example, each of the plurality of second portions 112*b* may be an organic portion, an organic material, an adhesive portion, a stretch portion, a bending portion, a damping portion, an elastic portion, an elasticity portion, or a ductile portion, or the like, but aspects of the present disclosure are not limited thereto.

A first surface of each of the plurality of first portions 112*a* and the plurality of second portions 112*b* may be connected to the first electrode in common. A second surface of each of the plurality of first portions 112*a* and the plurality of second portions 112*b* may be connected to the second electrode in common.

In each of the vibration devices 11, 12, 13, and 14 of the sound apparatus 1 according to the ninth aspect of the present disclosure, the plurality of first portions 112*a* and the plurality of second portion 112*b* may be disposed on (or connected to) a same plane, and thus, the vibration layer 112 may have a single thin film-type. Accordingly, each of the vibration devices 11, 12, 13, and 14 may be vibrated in a vertical direction by the first portions 112*a* having a vibration characteristic and may be bent in a curved shape by the second portions 112*b* having flexibility. For example, each of the vibration devices 11, 12, 13, and 14 including the vibration layer 112 may have a 2-2 composite structure, and thus, may have a resonance frequency of 20 kHz or less, but aspects of the present disclosure are not limited thereto.

Tenth Aspect

Figure 18:
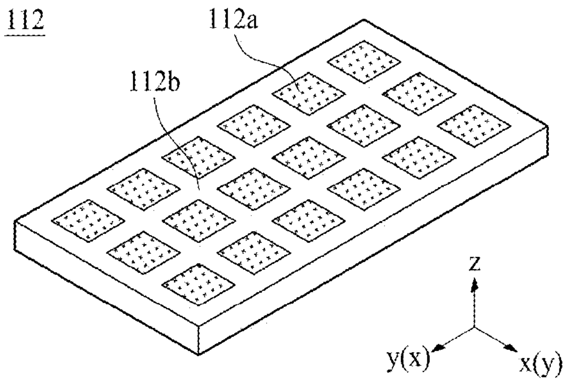
FIG. 18 is a perspective view illustrating a vibration layer of a vibration device according to a tenth aspect of the present disclosure.

In an aspect of the present disclosure, a modification example of the structure of a vibration layer in a vibration device of the sound apparatus 1 according to the tenth aspect of the present disclosure will be described. FIG. 18 is a perspective view illustrating a vibration layer in a vibration device of the sound apparatus according to the tenth aspect of the present disclosure.

As illustrated in FIG. 18, in each of the vibration devices 11, 12, 13, and 14 according to an aspect of the present disclosure, a vibration layer 112 of the vibration generating part 11A may include a plurality of first portions 112*a* and a second portion 112*b*. For example, the vibration layer 112 may include a plurality of first portions 112*a* and a second portion 112*b* which is disposed between the plurality of first portions 112*a*.

Each of the plurality of first portions 112*a* may be disposed to be spaced apart from one another along each of an x-axis direction and a y-axis direction. For example, each of the plurality of first portions 112*a* may have a hexahedral shape having a same size and may be disposed in a lattice shape. Each of the plurality of first portions 112*a* may be substantially a same as the first portion 112*a* described above with reference to FIG. 17, and thus, repeated descriptions may be omitted.

The second portion 112*b* may be disposed between the plurality of first portions 112*a* along each of the x-axis direction and the y-axis direction. The second portion 112*b* may be configured to fill a gap or a space between two adjacent first portions 112*a* or to surround each of the plurality of first portions 112*a*, and thus, the second portion 112*b* may be connected to or attached on lateral surface of adjacent first portion 112*a*. The second portion 112*b* may be substantially a same as the second portions 112*b* described above with reference to FIG. 17, and thus, repeated descriptions may be omitted.

A first surface of each of the plurality of first portions 112*a* and the second portion 112*b* may be connected to a first electrode in common. A second surface of each of the plurality of first portions 112*a* and the second portion 112*b* may be connected to a second electrode in common.

In each of the vibration devices 11, 12, 13, and 14 of the sound apparatus according to the tenth aspect of the present disclosure, the plurality of first portions 112*a* and the second portion 112*b* may be disposed on (or connected to) a same plane, and thus, the vibration layer 112 may have a single thin film-type. Accordingly, each of the vibration devices 11, 12, 13, and 14 may be vibrated in a vertical direction by the first portions 112*a* having a vibration characteristic and may be bent in a curved shape by the second portions 112*b* having flexibility. For example, each of the vibration devices 11, 12, 13, and 14 including the vibration layer 112 may have a 1-3 composite structure, and thus, may have a resonance frequency of 20 kHz or less, but aspects of the present disclosure are not limited thereto.

Eleventh Aspect

In an aspect of the present disclosure, a detailed configuration example will be described where the sound apparatus 1 according to the first to tenth aspects of the present disclosure is a display apparatus and the vibration member 90 performs a function of a display panel of the display apparatus. Descriptions of common elements which are substantially a same as the first to fifth aspects of the present disclosure may be omitted or will be briefly given below.

Figure 19:
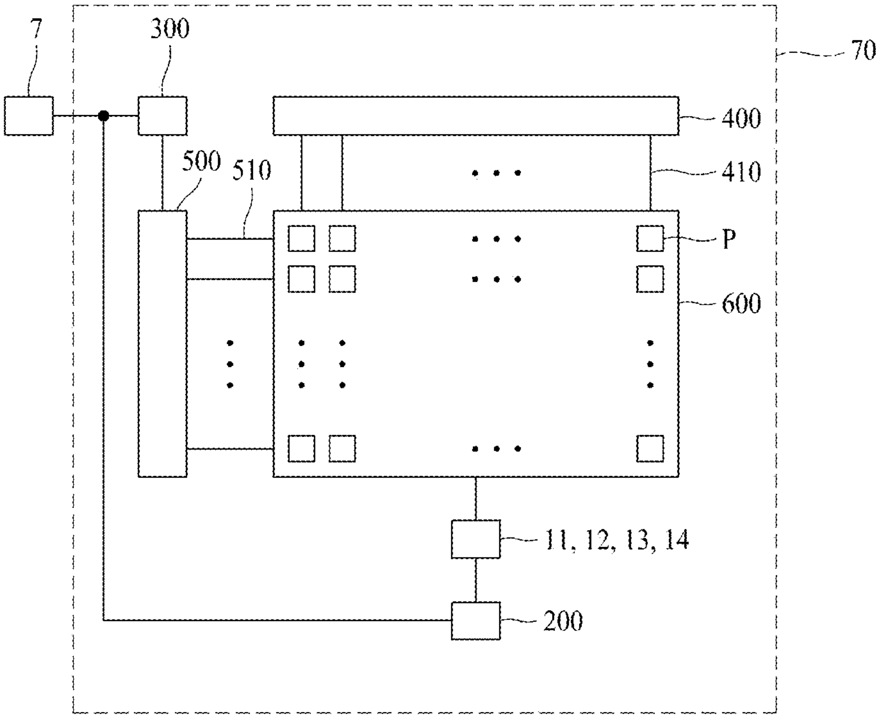
FIG. 19 illustrates a display apparatus according to an eleventh aspect of the present disclosure.

FIG. 19 is a configuration diagram of a display apparatus 70 according to the eleventh aspect of the present disclosure. The use purpose of the display apparatus 70 according to an aspect of the present disclosure may be, for example, electronic posters, digital bulletin boards, electronic advertisement signboards, computer screens, or television receivers, or the like, but aspects of the present disclosure are not limited thereto. A host system 7 and a structure of vibration devices 11, 12, 13, and 14 may be substantially a same as one of the first to tenth aspects of the present disclosure, and thus, descriptions may be omitted.

As illustrated in FIG. 19, the display apparatus 70 may include a sound apparatus including vibration devices 11, 12, 13, and 14, a controller 200, a panel controller 300, a data driving circuit 400, a gate driving circuit 500, and a display panel 600. The display apparatus 70 may be an apparatus which displays an image by a display panel 600 based on RGB data (or RGBW data) or the like input thereto and generates a sound based on a driving signal or the like input thereto.

The panel controller 300 may control the data driving circuit 400 and the gate driving circuit 500 based on image data and a timing signal input from the host system 7. The data driving circuit 400 may supply data voltages or the like to a plurality of pixels P through a driving line 410 disposed at each column of the plurality of pixels P. The gate driving circuit 500 may supply a control signal to the plurality of pixels P through a driving line 510 disposed at each row of the plurality of pixels P. Moreover, each of the driving line 410 and the driving line 510 may be provided in a plurality lines (or wires).

The display panel 600 may include the plurality of pixels P disposed to configure a plurality of rows and a plurality of columns. When the display apparatus 70 displays a color image, the pixel P may be a subpixel which displays any one of a plurality of colors (for example, RGB or RGBW data) implementing a color image.

The display panel 600 used to one or more aspects of the present disclosure may use all types (or shapes) of display panels such as a liquid crystal display panel, an organic light emitting display panel, and an electroluminescent display panel, or the like. But aspects of the present disclosure are not limited thereto. The display panel 600 may be a display panel which is vibrated by a sound apparatus according to an aspect of the present disclosure to generate a sound. A types (or shapes) or a size of a display panel 600 applied to a display apparatus 70 according to an aspect of the present disclosure may not limited.

According to one or more aspects of the present disclosure, when the display panel 600 is the liquid crystal display panel, the display panel 600 may include a plurality of gate lines, a plurality of data lines, and a plurality of pixels respectively provided at each of intersection regions of the gate lines and the data lines. In addition, the display panel 600 may include an array substrate including a thin film transistor (TFT) which is a switching element for adjusting a light transmittance of each of the plurality of pixels P, an upper substrate including a color filter and/or a black matrix or the like, and a liquid crystal layer between the array substrate and the upper substrate.

When the display panel 600 is the organic light emitting display panel, the display panel 600 may include a plurality of gate lines, a plurality of data lines, and a plurality of pixels respectively provided at each of intersection regions of the gate lines and the data lines. In addition, the display panel 600 may include an array substrate including a TFT which is an element for selectively applying a voltage to each of the pixels P, an organic light emitting device layer on the array substrate, and an encapsulation substrate disposed on the array substrate to cover the organic light emitting device layer. The encapsulation substrate may protect the TFT and the organic light emitting device layer from an external impact and may prevent water or oxygen from penetrating into the organic light emitting device layer. Moreover, a layer formed on the array substrate may include an inorganic light emitting layer (for example, a nano-sized material layer, a quantum dot light emitting layer, or the like). As another aspect of the present disclosure, the layer formed on the array substrate may include a micro light emitting diode.

The display panel 600 may further include a backing such as a metal plate attached on the display panel 600. However, the display panel 600 may include other structures, for example, other structures formed of different materials.

Each of the controller 200, the panel controller 300, the data driving circuit 400, and the gate driving circuit 500 may be configured by one semiconductor IC or a plurality of semiconductor integrated circuits. Moreover, some or all of the controller 200, the panel controller 300, the data driving circuit 400, and the gate driving circuit 500 may be integrally configured as one semiconductor integrated circuit (or one body or a single body).

The display apparatus 70 according to an aspect of the present disclosure may be supplied with an image signal (for example, RGB data or RGBW data), a driving signal and a timing signal (a vertical synchronization signal, a horizontal synchronization signal, and a data enable signal, or the like) from the host system 7, and thus, may display an image and simultaneously may generate a sound. The display panel 600 may include an image display surface configured to display an image and a rear surface (or a backside surface) which is opposite to the image display surface. The vibration devices 11, 12, 13, and 14 may be connected to the rear surface of the display panel 600. Therefore, the display panel 600 may include a function of displaying an image and a function of the vibration member 90 of the first to tenth aspects of the present disclosure. In an aspect of the present disclosure, the display apparatus 70 having an acoustic effect where a sound may be generated (or output) from an image displayed by the display panel 600 may be provided. For example, vibrations of the plurality of vibration devices 11, 12, 13, and 14 may be transferred to the rear surface of the display panel 600. For example, the display panel 600 vibrates based on vibrations transferred by the plurality of vibration devices 11, 12, 13, and 14. Thus, the sound may be output (or generated) from an image displayed on the image display surface of the display panel 600.

A sound apparatus according to an aspect of the present disclosure may be applied to a sound apparatus disposed or included at an apparatus. The apparatus according to an aspect of the present disclosure may be applied to mobile apparatuses, video phones, smart watches, watch phones, wearable apparatuses, foldable apparatuses, rollable apparatuses, bendable apparatuses, flexible apparatuses, curved apparatuses, sliding apparatuses, variable apparatuses, electronic organizers, electronic book, portable multimedia players (PMPs), personal digital assistants (PDAs), MP3 players, mobile medical devices, desktop personal computers (PCs), laptop PCs, netbook computers, workstations, navigation apparatuses, automotive navigation apparatuses, automotive display apparatuses, automotive apparatuses, theater apparatuses, theater display apparatuses, TVs, wall paper display apparatuses, signage apparatuses, game apparatuses, notebook computers, monitors, cameras, camcorders, home appliances, etc. Moreover, the sound apparatus according to an aspect of the present disclosure may be applied to or included into organic light-emitting lighting apparatuses or inorganic light-emitting lighting apparatuses. When the sound apparatus of an aspect of the present disclosure is applied to or included into lighting apparatuses, the lighting apparatus may act as lighting and a speaker. Furthermore, when the sound apparatus of an aspect of the present disclosure is applied to or included into a mobile device, or the like, the sound apparatus may act as one or more of a speaker, a receiver, and a haptic apparatus, but aspects of the present disclosure are not limited thereto.

A sound apparatus according to an aspect of the present disclosure will be described below.

A sound apparatus according to one or more aspects of the present disclosure may comprise a vibration member having a plate shape, and a plurality of vibration devices disposed at a surface of the vibration member to vibrate based on a driving signal input thereto, each of the plurality of vibration devices may have a rectangular shape and may be disposed to be rotation-symmetric, and a short side of one of the plurality of vibration devices may be opposite to a long side of another vibration device.

According to one or more aspects of the present disclosure, the plurality of vibration devices may be driven by a common driving circuit.

According to one or more aspects of the present disclosure, the plurality of vibration devices may be attached on the vibration member by an adhesive member.

According to one or more aspects of the present disclosure, the sound apparatus may further comprise a mass member disposed at at least a portion of the plurality of vibration devices.

According to one or more aspects of the present disclosure, the sound apparatus may comprise an elastic member between the mass member and the plurality of vibration devices.

According to one or more aspects of the present disclosure, the mass member may have a circular shape and may be disposed over the plurality of vibration devices.

According to one or more aspects of the present disclosure, a center of the mass member may match or correspond to a rotation-symmetric center.

According to one or more aspects of the present disclosure, a radius of the mass member may be shorter than the short side of the vibration device.

According to one or more aspects of the present disclosure, a radius of the mass member may be longer than the short side of the vibration device and may be shorter than the long side of the vibration device.

According to one or more aspects of the present disclosure, the mass member may have a circular ring shape and may be disposed over the plurality of vibration devices, and a center of the mass member may match or correspond to a rotation-symmetric center.

According to one or more aspects of the present disclosure, an inner circumference radius of the mass member may be longer than the short side of the vibration device.

According to one or more aspects of the present disclosure, an outer circumference radius of the mass member may be shorter than the long side of the vibration device.

According to one or more aspects of the present disclosure, the mass member may be disposed near the short side, which is not opposite to the another vibration device, of a pair of short sides of the vibration device.

According to one or more aspects of the present disclosure, the plurality of vibration devices may comprise a first vibration device, a second vibration device, a third vibration device, and a fourth vibration device, the short side of the first vibration device may be opposite to the long side of the second vibration device, the short side of the second vibration device may be opposite to the long side of the third vibration device, the short side of the third vibration device may be opposite to the long side of the fourth vibration device, and the short side of the fourth vibration device may be opposite to the long side of the first vibration device.

According to one or more aspects of the present disclosure, the sound apparatus may further comprise a mass member disposed at at least a portion of the plurality of vibration devices.

According to one or more aspects of the present disclosure, the sound apparatus may further comprise an elastic member between the mass member and the plurality of vibration devices.

According to one or more aspects of the present disclosure, long-axis directions of two adjacent vibration devices of the plurality of vibration devices may intersect with each other.

According to one or more aspects of the present disclosure, the plurality of vibration devices may comprise a first vibration device, a second vibration device, and a third vibration device, the long side of the first vibration device may be between the short side of the second vibration device and the short side of the third vibration device, the short side of the second vibration device may be opposite to the long side of one side of the first vibration device, and the short side of the third vibration device may be opposite to the long side of another side of the first vibration device.

According to one or more aspects of the present disclosure, a long-axis direction of the first vibration device may intersect with long-axis directions of each of the second vibration device and the third vibration device.

According to one or more aspects of the present disclosure, each of the plurality of vibration devices may be a piezoelectric device.

According to one or more aspects of the present disclosure, the vibration member may include at least one material of a metal, resin, glass, wood, rubber, plastic, fiber, cloth, paper, leather, or carbon; and the vibration member may be at least one of a display panel including a pixel configured to display an image, a screen panel on which an image is to be projected from a display apparatus, a lighting panel, a light emitting diode lighting panel, an organic light emitting lighting panel, an inorganic light emitting lighting panel, a signage panel, a vehicular interior material, a vehicular glass window, a vehicular exterior material, a vehicular seat interior material, a vehicular ceiling material, a building ceiling material, a building interior material, a building glass window, an aircraft interior material, an aircraft glass window, and a mirror.

According to one or more aspects of the present disclosure, the vibration member may be a display panel of a display apparatus, the display panel may include an image display surface on which an image is displayed, and a rear surface opposite to the image display surface, and vibrations of the plurality of vibration devices may be transmitted to the rear surface of the display panel.

According to one or more aspects of the present disclosure, the display panel may vibrate based on vibrations generated by one or more of the plurality of vibration devices, and a sound may be output from an image displayed on the display panel.

A sound apparatus according to one or more aspects of the present disclosure may include a vibration member having a plate shape and first to fourth vibration devices disposed at a surface of the vibration member to vibrate based on a driving signal input thereto. Each of the first to fourth vibration devices may have a rectangular shape and is disposed to be rotationally symmetrical at a rotation angle of 90 degree with respect to a symmetric central point. A short side of one vibration devices may be close to a long side of a neighboring vibration device.

According to one or more aspects of the present disclosure, the first to fourth vibration devices may be attached on the vibration member by an adhesive member.

According to one or more aspects of the present disclosure, the sound apparatus may further comprise a mass member disposed at at least a portion of the first to fourth vibration devices.

It will be apparent to those skilled in the art that various modifications and variations may be made in the present disclosure without departing from the scope of the disclosures. Thus, it is intended that the present disclosure covers the modifications and variations of this disclosure that come within the scope of the appended claims and their equivalents.

What is claimed is:

1. A sound apparatus, comprising:
a vibration member having a plate shape;
a plurality of vibration devices disposed at a surface of the vibration member to vibrate based on a driving signal input thereto; and
an adhesive member disposed between the surface of the vibration member and each of the plurality of vibration devices,
wherein, in a plane, the plurality of vibration devices are spaced apart from one another by a pre-defined distance without overlapping one another,
wherein each of the plurality of vibration devices has a rectangular shape and is disposed to be rotation-symmetric, and
wherein a short side of one of the plurality of vibration devices is opposite to a long side of another vibration device.

2. The sound apparatus of claim 1, wherein the plurality of vibration devices are driven by a common driving circuit.

3. The sound apparatus of claim 1, wherein the plurality of vibration devices are disposed on same plane, and/or
wherein at least a portion of each of the plurality of vibration devices is attached on the surface of the vibration member by the adhesive member.

4. The sound apparatus of claim 1, further comprising a mass member disposed at at least a portion of the plurality of vibration devices.

5. The sound apparatus of claim 4, further comprising an elastic member disposed between the mass member and the plurality of vibration devices.

6. The sound apparatus of claim 4, wherein the mass member has a circular shape and is disposed over the plurality of vibration devices.

7. The sound apparatus of claim 6, wherein a center of the mass member matches a rotation-symmetric center.

8. The sound apparatus of claim 7, wherein a radius of the mass member is shorter than the short side of the vibration device.

9. The sound apparatus of claim 7, wherein a radius of the mass member is longer than the short side of the vibration device and is shorter than the long side of the vibration device.

10. The sound apparatus of claim 5, wherein the mass member has a circular ring shape and is disposed over the plurality of vibration devices, and
wherein a center of the mass member matches a rotation-symmetric center.

11. The sound apparatus of claim 10, wherein an inner circumference radius of the mass member is longer than the short side of the vibration device.

12. The sound apparatus of claim 10, wherein an outer circumference radius of the mass member is shorter than the long side of the vibration device.

13. The sound apparatus of claim 4, wherein the mass member is disposed near the short side, which is not opposite to the another vibration device, of a pair of short sides of the vibration device.

14. The sound apparatus of claim 1, wherein the plurality of vibration devices comprise a first vibration device, a second vibration device, a third vibration device, and a fourth vibration device;

the short side of the first vibration device is opposite to the long side of the second vibration device;

the short side of the second vibration device is opposite to the long side of the third vibration device;

the short side of the third vibration device is opposite to the long side of the fourth vibration device; and the short side of the fourth vibration device is opposite to the long side of the first vibration device.

15. The sound apparatus of claim 14, further comprising a mass member disposed at at least a portion of the plurality of vibration devices.

16. The sound apparatus of claim 14, further comprising an elastic member between the mass member and the plurality of vibration devices.

17. The sound apparatus of claim 14, wherein long-axis directions of two adjacent vibration devices of the plurality of vibration devices intersect with each other.

18. The sound apparatus of claim 1, wherein the plurality of vibration devices comprise a first vibration device, a second vibration device, and a third vibration device;

the long side of the first vibration device is between the short side of the second vibration device and the short side of the third vibration device;

the short side of the second vibration device is opposite to the long side of one side of the first vibration device; and the short side of the third vibration device is opposite to the long side of another side of the first vibration device.

19. The sound apparatus of claim 18, wherein a long-axis direction of the first vibration device intersects with long-axis directions of each of the second vibration device and the third vibration device.

20. The sound apparatus of claim 18, wherein each of the plurality of vibration devices is a piezoelectric device.

21. The sound apparatus of claim 1, wherein the vibration member includes at least one material of a metal, resin, glass, wood, rubber, plastic, fiber, cloth, paper, leather, or carbon; and wherein the vibration member is at least one of a display panel including a pixel configured to display an image, a screen panel on which an image is to be projected from a display apparatus, a lighting panel, a light emitting diode lighting panel, an organic light emitting lighting panel, an inorganic light emitting lighting panel, a signage panel, a vehicular interior material, a vehicular glass window, a vehicular exterior material, a vehicular seat interior material, a vehicular ceiling material, a building ceiling material, a building interior material, a building glass window, an aircraft interior material, an aircraft glass window, and a mirror.

22. The sound apparatus of claim 1, wherein the vibration member is a display panel of a display apparatus, wherein the display panel includes an image display surface on which an image is displayed, and a rear surface opposite to the image display surface, and wherein vibrations of the plurality of vibration devices are transferred to the rear surface of the display panel.

23. The sound apparatus of claim 22, wherein the display panel vibrates based on vibrations generated by one or more of the plurality of vibration devices, and wherein a sound is output from an image displayed on the display panel.

24. A sound apparatus, comprising:

a vibration member having a plate shape; and first to fourth vibration devices disposed at a surface of the vibration member to vibrate based on a driving signal input thereto, wherein each of the first to fourth vibration devices has a rectangular shape and is disposed to be rotationally symmetrical at a rotation angle of 90 degree with respect to a symmetric central point, and wherein a short side of one vibration devices is close to a long side of a neighboring vibration device.

25. The sound apparatus of claim 24, wherein the first to fourth vibration devices are attached on the vibration member by an adhesive member.

26. The sound apparatus of claim 24, further comprising a mass member disposed at at least a portion of the first to fourth vibration devices.

* * * * *